United States Patent
Chen et al.

(10) Patent No.: US 12,152,192 B1
(45) Date of Patent: Nov. 26, 2024

(54) DISPLACEMENT SYSTEM SUITABLE FOR STRONG HETEROGENEOUS OIL RESERVOIR AND ITS APPLICATION

(71) Applicant: TIANFU YONGXING LABORATORY, Chengdu (CN)

(72) Inventors: Qingyuan Chen, Chengdu (CN); Jinzhou Zhao, Chengdu (CN); Wanfen Pu, Chengdu (CN); Xiaodong Tang, Chengdu (CN); Chao Shen, Chengdu (CN); Shuai Zhao, Chengdu (CN); Su Liu, Chengdu (CN); Ziyuan Yi, Chengdu (CN); Zijia Liao, Chengdu (CN)

(73) Assignee: TIANFU YONGXING LABORATORY (CN)

( * ) Notice: Subject to any disclaimer, the term of this patent is extended or adjusted under 35 U.S.C. 154(b) by 0 days.

(21) Appl. No.: 18/663,154

(22) Filed: May 14, 2024

(30) Foreign Application Priority Data

Oct. 18, 2023 (CN) .......................... 202311351426.7

(51) Int. Cl.
*E21B 43/34* (2006.01)
*C09K 8/584* (2006.01)
*C09K 8/588* (2006.01)

(52) U.S. Cl.
CPC .............. *C09K 8/584* (2013.01); *C09K 8/588* (2013.01)

(58) Field of Classification Search
CPC .......... C09K 8/584; C09K 8/588; E21B 43/34
USPC ...................................................... 166/305.1
See application file for complete search history.

(56) References Cited

U.S. PATENT DOCUMENTS

| | | | | |
|---|---|---|---|---|
| 5,706,895 A * | 1/1998 | Sydansk | ................... | C09K 8/94 507/216 |
| 7,199,083 B2 * | 4/2007 | Zevallos | ................... | C09K 8/38 507/140 |
| 9,034,805 B2 * | 5/2015 | Rey | ........................... | C09K 8/90 166/305.1 |
| 2015/0107832 A1 * | 4/2015 | DeWolf | ................... | C09K 8/70 166/266 |

* cited by examiner

*Primary Examiner* — William D Hutton, Jr.
*Assistant Examiner* — Ashish K Varma

(57) ABSTRACT

A displacement system designed for robust heterogeneous oil reservoirs and its application within the oil exploitation field. System comprises a polymer-enhanced foam plugging agent and an active polymer flooding agent. Plugging agent consists of 0.12% bio-polysaccharide polymer diutan gum foam stabilizer and 0.4% α-olefin sulfonate foaming agent by mass. The active polymer flooding agent is formulated through free radical polymerization, with components comprising a total monomer concentration of 27.5%, wherein monomer A to monomer B ratio is 7.5:2.5, monomer C constitutes 5.5% of the total monomer concentration, and water comprises the remaining. Monomer A is acrylamide, monomer B is 2-acrylamide-2-methyl propane sulfonic acid, and monomer C is a quaternary ammonium salt type active monomer. Demonstrated through parallel core displacement experiments, this displacement system exhibits effective displacement in heterogeneous oil reservoirs with a permeability gradation of 30 at 65° C., significantly enhancing oil recovery rates in robust heterogeneous oil reservoirs.

4 Claims, 23 Drawing Sheets

DISPLACEMENT SYSTEM SUITABLE FOR STRONG HETEROGENEOUS OIL RESERVOIR AND ITS APPLICATION

TECHNICAL FIELD

The invention belongs to the field of oil exploitation technology, and specifically relates to a displacement system suitable for strong heterogeneous oil reservoir and its application.

BACKGROUND ART

At present, most of the main oil fields in China have entered the middle and late stage of water injection development, and the problem of oil reservoir heterogeneity is serious, the cumulative crude oil recovery after primary oil recovery and secondary oil recovery is usually less than 40%. Strong heterogeneous oil reservoir generally has problems such as insufficient overall water injection, formation pressure deficit, uneven interlayer pressure, and prominent interlayer contradiction. When a single polymer is injected into the strong heterogeneous oil reservoir, the polymer solution is easy to advance along the high-permeability region, resulting in invalid water circulation in local areas, early polymer formation in oil wells, and low utilization of low-permeability layers. Therefore, it is urgent to explore the research and application of chemical displacement technology suitable for strong heterogeneous oil reservoir. Based on this, in view of the strong heterogeneous oil reservoir, we should first consider the plugging agent with the displacement ability to conduct the profile control for the reservoir, so as to improve the heterogeneity of the reservoir. On this basis, the high-efficiency oil displacement agent is used for oil displacement, and finally the purpose of improving oil recovery rate is achieved.

As an intelligent working fluid, foam has multiple functions. First of all, the viscosity of the foam fluid is high, which can effectively control the fluid mobility and expand the swept volume of the subsequent displacement fluid; secondly, the foam has the characteristics of 'plugging high instead of plugging low, plugging water instead of plugging oil'. It has poor stability under oil-bearing conditions and good stability under high water-bearing content conditions, the preponderance flow path can be selected for plugging, and the mobility control ability of foam is positively correlated with permeability, that is, the stability of foam in large pores is better, and the stability in small pores is poor. Therefore, the foam system has great application potential in profile control and water plugging.

Surface active polymer is a new type of oil displacement agent, its chemical composition is single, which can avoid the disadvantages of poor oil washing efficiency of conventional polymer and chromatographic separation of poly/tabular binary displacement. Through the molecular structure design, the C—H chain on the acrylamide molecule is usually used as the skeleton, and a functional group with certain activity is introduced, and then it is polymerized with other monomers to finally obtain an active polymer. The introduction of surface active monomers into polymer molecules can improve the viscosity, temperature resistance and salt resistance of polymer aqueous solution, ensure that it can reduce the oil-water interface, and improve the swept volume and oil washing efficiency. Therefore, surface active polymer has great application potential in enhancing oil recovery.

SUMMARY

The purpose of the invention is to provide a displacement system suitable for strong heterogeneous oil reservoir and its application, which solves the problem that most profile control and plugging agents cannot effectively plug deep fractures and large pores in the layer, and the invention can effectively improve the strong heterogeneity of the oil reservoir and increase the yield of strong heterogeneous oil reservoir.

In order to achieve the above purpose, the invention adopts a composite displacement system suitable for strong heterogeneous reservoir, including polymer enhanced foam and surface active polymer. According to the mass percentage, the enhanced foam includes the following components: foaming agent 0.4%, foam stabilizer 0.12%, the foaming agent is α-olefin sulfonate (AOS), and the foam stabilizer is biological polysaccharide diutan gum (DYG). The above surface active polymer includes the following components: total monomer concentration 27.5%, monomer A:monomer B=7.5:2.5, monomer C accounts for 5.5% of the total monomer concentration, and the remainder is water; the monomer A is acrylamide, the monomer B is acrylic acid or 2-acrylamido-2-methylpropanesulfonic acid, and the monomer C is a quaternary ammonium salt type active monomer.

The polymer enhanced foam in the invention can be prepared according to the following method: configuring the aqueous solution of the foam stabilizer B, and adding the foaming agent A to the polymer solution in proportion to obtain the polymer enhanced foam base liquid. By transferring the polymer enhanced foam base liquid to the foaming device and then stirring it for foaming after the nitrogen is introduced, the polymer enhanced foam system is obtained.

The surface active polymer in the invention can be prepared according to the following method: dissolving monomer A, monomer B and monomer C in pure water according to the ratio, and adjusting the pH value of the system to 7-7.5, and then transferring the solution to a three-necked flask, introducing the nitrogen for 30 min to make the system in an anaerobic state. After the temperature is raised to the specified temperature, slowly adding the initiator azobisisobutamidine hydrochloride (V50) solution to the system according to a certain proportion, and the reaction is continued under sealed conditions for a period of time to obtain a colloidal solid product. And washing the product several times with anhydrous ethanol, and then cutting and drying it to obtain the surface active polymer.

The monomer C in the invention can be prepared according to the following methods: (1) mixing N, N-dimethyl-1,3-propanediamine and 2-methacryloyl chloride in dichloromethane solution, and then introducing nitrogen for magnetic stirring, and controlling the temperature below 5° C., after the reaction, extracting the product in a solvent with a volume ratio of water to dichloromethane of 5:1, and taking the subnatant, then carrying out the rotary evaporation at 45° C. to remove the excess dichloromethane and obtain the intermediate product; (2) mixing the intermediate product, tetradecane bromide and acetone and keeping them in a sealed state after the nitrogen is introduced at room temperature, heating the system to 55° C., and maintaining the stirring state until the reaction is completed, reducing the temperature of the system to room temperature, repeatedly extracting the crude product with ether for 3 times, and subjecting the subnatant to rotary evaporation at 60° C., removing the ether in the product to obtain the active monomer.

The above polymer enhanced foam and surface active polymer are used in the heterogeneous core displacement experiment according to a certain slug combination. Finally, the best composite displacement system in the strong heterogeneous core is 0.2 PV polymer enhanced foam+0.4 PV surface active polymer.

DETAILED DESCRIPTION OF THE EMBODIMENTS

In order to make the purpose, technical scheme and advantages of the invention more clear, the following is a further detailed description of the invention in combination with the attached drawings and embodiments. It should be understood that the embodiments described here are used only to describe the technical scheme of the invention and are not used to limit the protection scope of the invention.

Embodiment 1. Determination of Polymer Enhanced Foam Formulation

Figure 1:
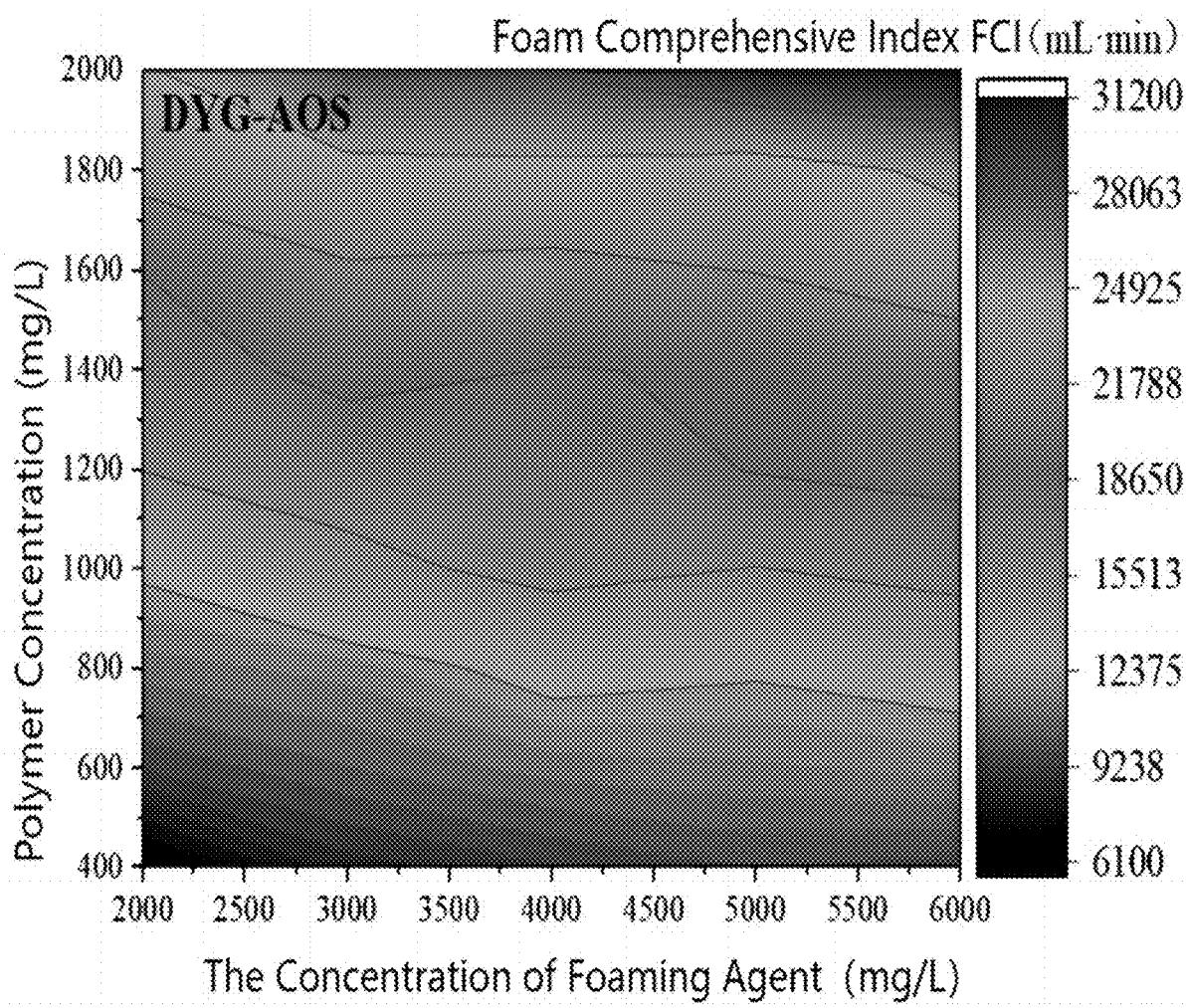
FIG. 1 is the contour map of FCI value of polymer enhanced foam which is composed of different concentrations of DYG and AOS.

Different amounts of DYG solution are prepared, and different amounts of foaming agent AOS are added to prepare different proportions of enhanced foam base solution, the 100 mL foam base solution is transferred to the foaming device, through the temperature control module, the temperature is controlled at 65° C., and the nitrogen is introduce, then it is stirred at a speed of 6000 r/min for 1 min. The foaming volume V0 and the drainage half-life t ½ of the foam are measured, and the foam comprehensive index FCI value of the enhanced foam is calculated. The contour map of the FCI value of the polymer enhanced foam which is composed of different amounts of DYG and AOS is shown in FIG. 1. From FIG. 1, it can be seen that with the increase of foaming agent concentration and foam stabilizer concentration, the FCI value of AOS-DYG polymer enhanced foam combination increases. When the concentration range of foaming agent is 0.2%~0.6% and the concentration range of foam stabilizer is 0.05%~0.2%, the FCI value of AOS-DYG enhanced foam increases the most, from 6138.08 mL·min to 31158.00 mL·min. Further observation shows that when the AOS concentration reaches 0.35%~0.45%, the contour line of FCI value begins to become gentle, which indicates that the foam performance of AOS-DYG enhanced foam reaches the best and remains stable after this range. At the same time, the analysis of the arrangement of contour lines shows that the FCI value increases synchronously with the increase of DYG concentration, when the polymer concentration is in the range of 0.11%~0.15%, the distance between the two contour lines reaches the maximum value, which indicates that the foam performance of the enhanced foam is relatively stable in this range. Therefore, the formula of enhanced foam is: N2+0.4% AOS+0.12% DYG.

Figure 2:
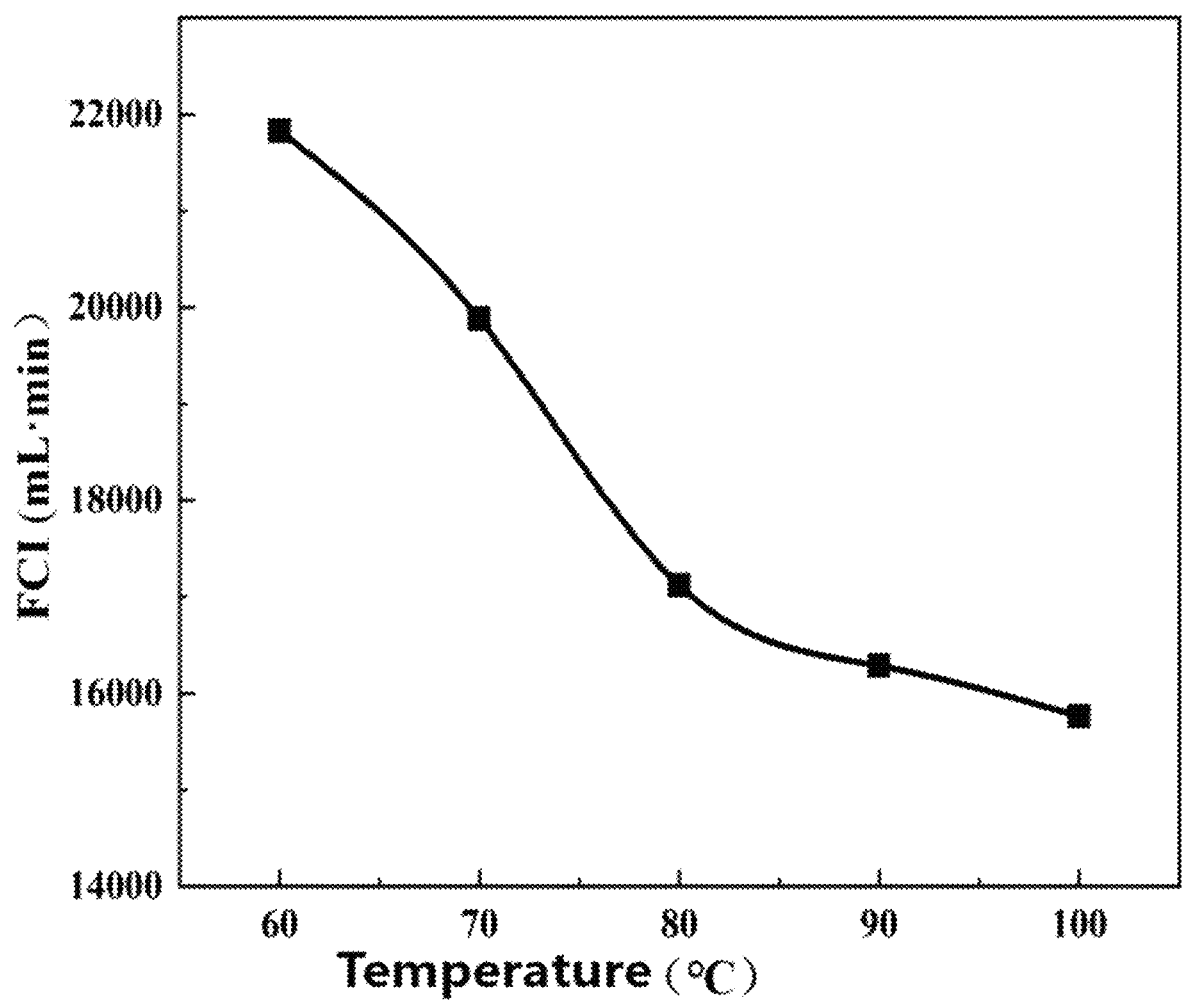
FIG. 2 shows the effect of temperature on the foam composite index of polymer enhanced foam.
Figure 3:
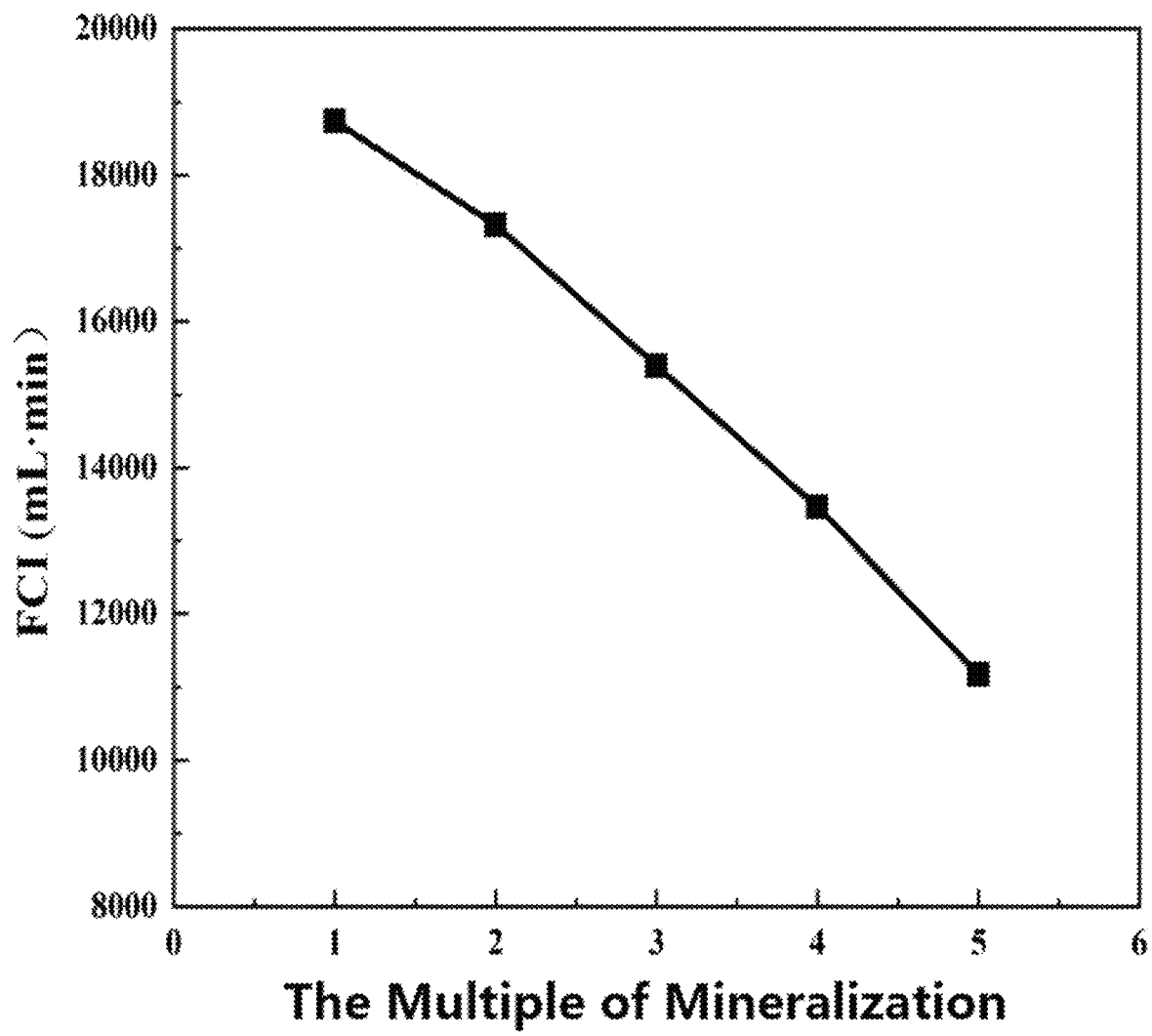
FIG. 3 shows the effect of mineralization multiple on the foam performance of polymer enhanced foam.

Embodiment 2. Study on the Influencing Factors of the Stability of Polymer Enhanced Foam System 1. Effect of Temperature on Foam Properties.
The specific experimental process is as follows: the foam stabilizer is configured to 0.12% solution, the foaming agent with a dosage of 0.4% is added, and the rest is added with water to prepare a 100 mL solution, which is placed in the foaming device. The temperature is set to 60° C., 70° C., 80° C., 90° C. and 100° C. by the temperature control module, and the stirring speed is 6000 r/min for 1 min. The foam composite index FCI of the enhanced foam system at different temperatures is investigated, the experimental results are shown in FIG. 2, it can be seen from FIG. 2 that the FCI value of the polymer enhanced foam system decreases with the increase of temperature. When the temperature is 100° C., the FCI is 15762.9 mL·min, and the FCI is about 72.21% when the temperature is at 60° C., indicating that the enhanced foam system has good temperature resistance.
2. Effect of Mineralization on Foam Performance.
The specific experimental process is as follows: under the condition of 1 times, 2 times, 3 times, 4 times and 5 times of simulated formation water (14596.8 mg/L) are prepared, a foam stabilizer with a dosage of 0.12% is added, a foaming agent with a dosage of 0.4% is also added, and the rest is added water to prepare a 100 mL solution, then the solution is placed in the foaming device, the temperature is set to 65° C. through the temperature control module, and the the simulated formation water is stirred at 6000 r/min for 1 min, the foam composite index FCI of the enhanced foam system is investigated under different mineralization conditions. The experimental results are shown in FIG. 3, it can be seen from FIG. 3 that when the mineralization increases from 1 to 5 times the mineralization of simulated formation water, the FCI value of the polymer enhanced foam system decreases from 18741.8 min·mL to 14248.9 mL·min, only decreasing by 24%, which shows a certain salt resistance.

3. Effect of Oil Content on Foam Performance.

Figure 4:
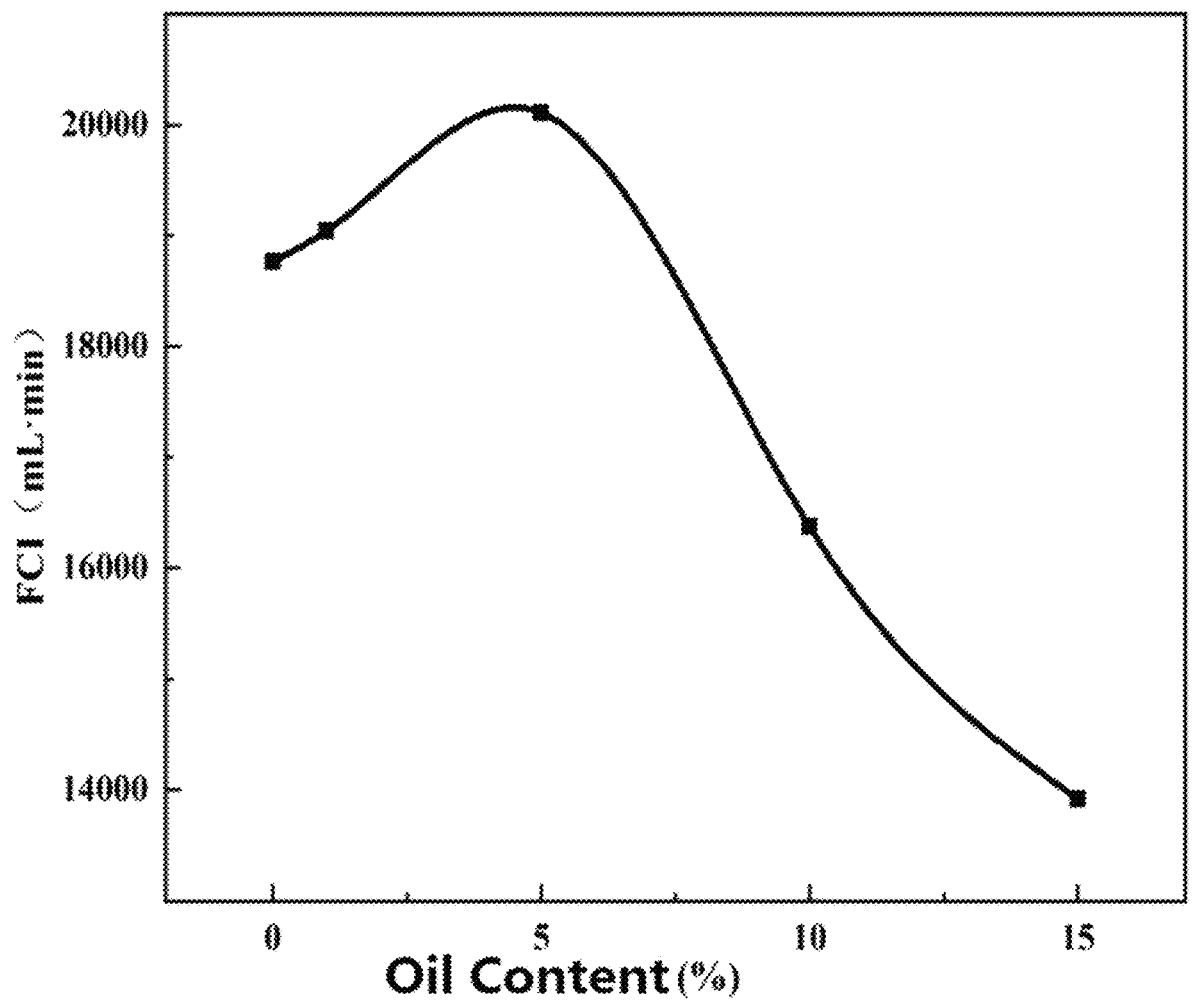
FIG. 4 shows the effect of oil content on the foam properties of polymer enhanced foam.

The specific experimental process is as follows: the foam stabilizer is configured to 0.12% solution, the foaming agent with a dosage of 0.4% is added, and the rest is added with water to prepare a 100 mL solution, the crude oil of 1%, 5%, 10% and 15% is also added to the solution, and then the solution is placed in the foaming device, the temperature is set to 65° C. by the temperature control module, and the solution is stirred at 6000 r/min for 1 min. The foam composite index FCI of the enhanced foam system under different oil content conditions is investigated, the experimental results are shown in FIG. 4, it can be seen from FIG. 4 that the FCI of the polymer enhanced foam system also shows a trend of increasing first and then decreasing with the increase of oil content. The main reason is that when the oil content is low, the crude oil and the enhanced foam will form emulsified oil droplets under high-speed stirring, and the emulsified droplets uniformly dispersed on the bubble surface hinder the mass transfer efficiency between bubbles to a certain extent, thereby improving the stability of the enhanced foam system. However, when the oil content gradually increases, the content of emulsified droplets increases and gradually embeds into the foam film, then the structure of the foam film becomes loose, the self-healing ability of the bubble is destroyed, the bubble burst is accelerated, and the stability of the foam is weakened.

4. Effect of Aging Time on Foam Properties.

Figure 5:
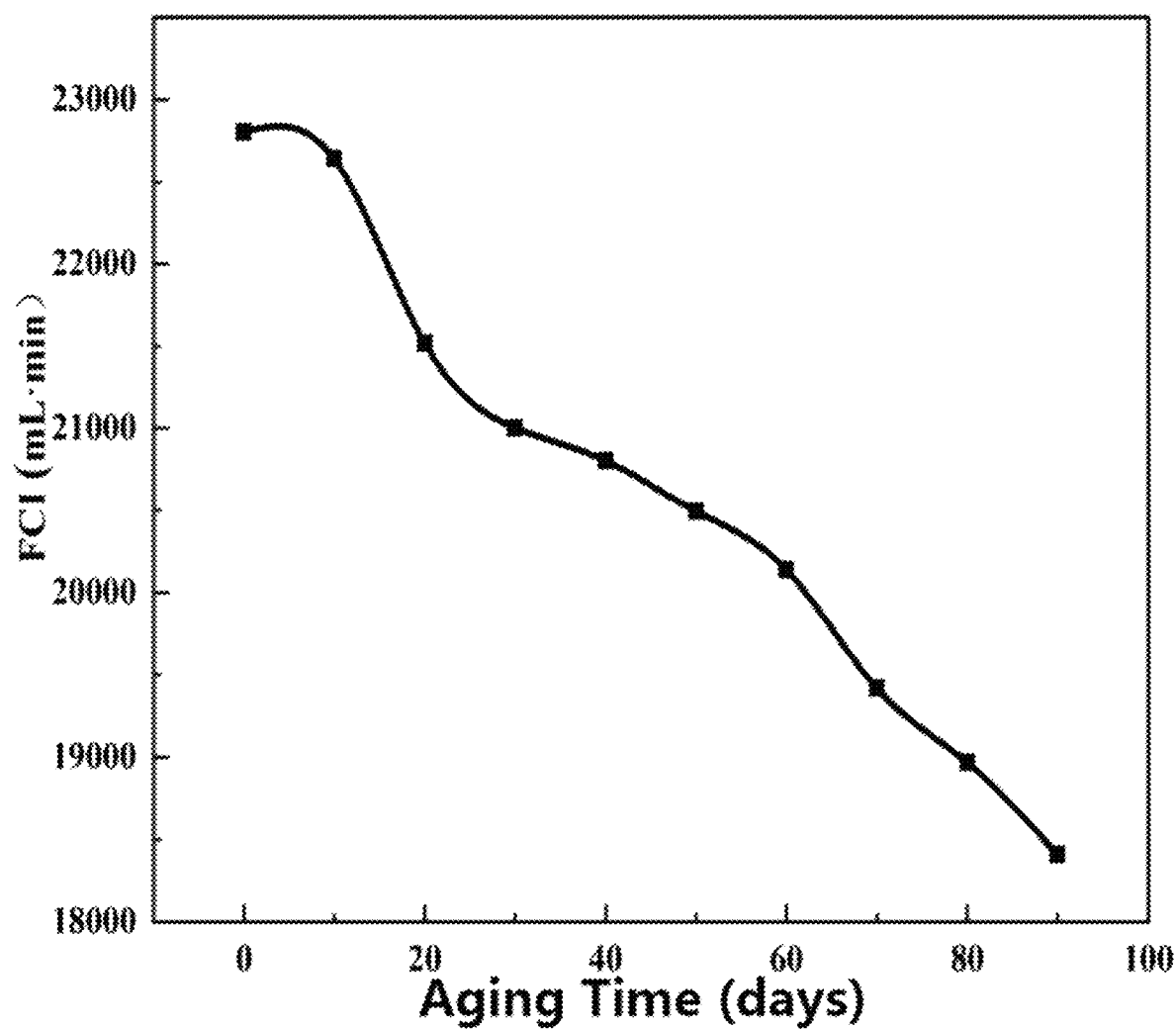
FIG. 5 shows the effect of aging time on the foam properties of polymer enhanced foam.

The specific experimental process is as follows: the foam stabilizer is configured to 0.12% solution, the foaming agent with a dosage of 0.4% is added, and the rest is added with water to prepare a 100 mL solution, which is placed in an oven at 65° C., and the solution is taken out every 10 days and placed in the foaming device, the temperature is set to 65° C. by the temperature control module, and the solution is stirred at 6000 r/min for 1 min. The foam composite index FCI of the enhanced foam system under different aging time conditions is investigated, the experimental results are shown in FIG. 5, it can be seen from FIG. 5 that the basic properties of the enhanced foam decreases with the extension of aging time, after aging in an oven at 65° C. for 90 days, the FCI value of the enhanced foam decreases from 22804.67 mL·min to 18409.63 mL·min, but the overall decrease is not obvious, and the FCI retention rate is 80.73%. Therefore, the enhanced foam system shows good anti-aging performance.

Embodiment 3 Optimization of Synthesis Conditions of Surface Active Polymer

1. Determination of Mass Ratio of Monomer A to Monomer B.

Figure 6:
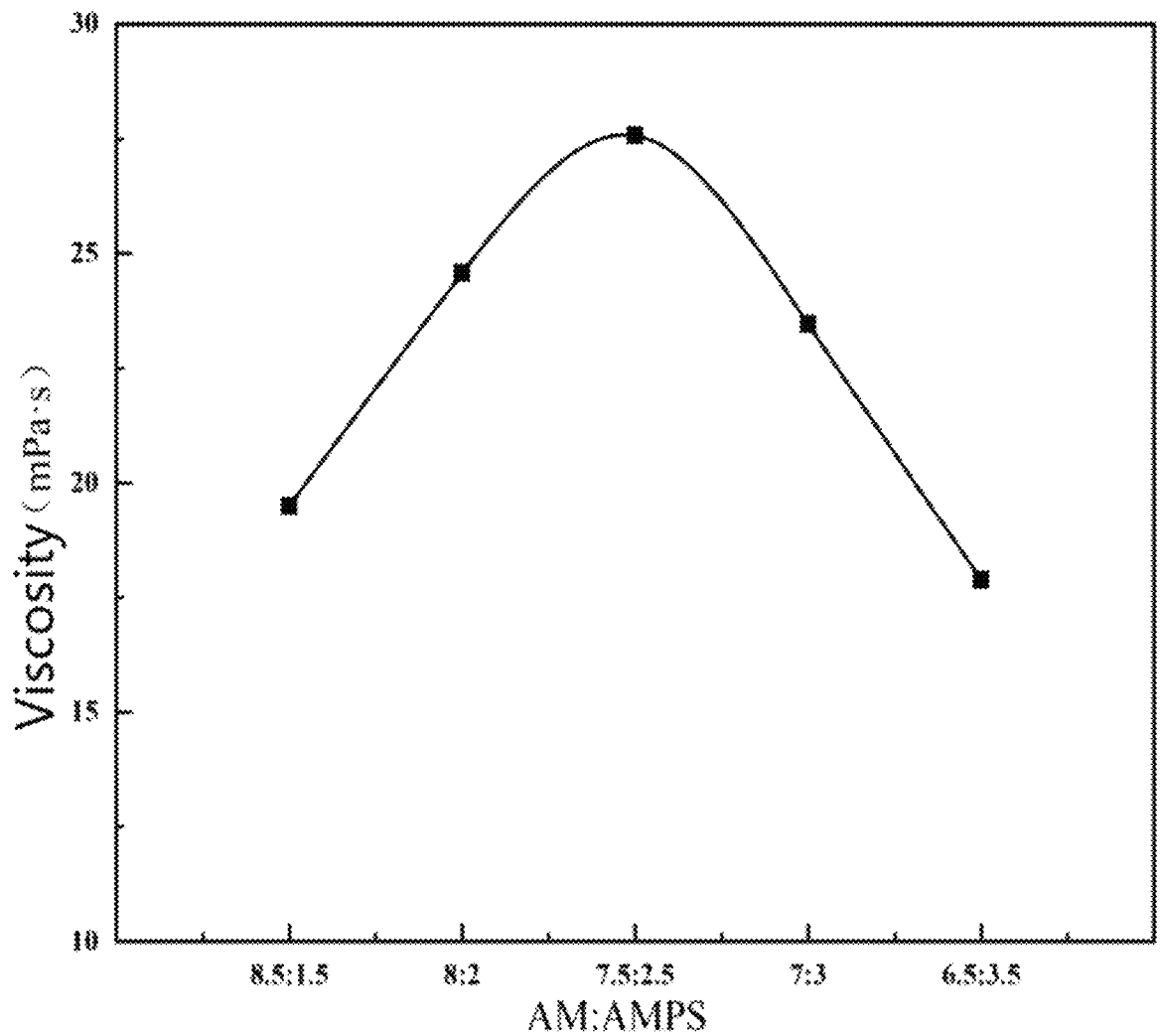
FIG. 6 shows the effect of the mass ratio of monomer A to monomer B on the viscosity of surface active polymer.

Firstly, the total monomer concentration is fixed at 27%, the initiator dosage is 0.6%, the active monomer C dosage is 6%, the reaction temperature is 47° C., and the mass ratio of monomer A:monomer B is changed to 8.5:1.5, 8:2, 7.5:2.5, 7:3, 6.5:3.5 to investigate its effect on the viscosity of the surface polymer, the experimental results are shown in FIG. 6, and the AM:AMPS in the figure is monomer A:monomer B. It can be seen from FIG. 6 that with the increase of the mass ratio of monomer A to monomer B, the viscosity of the surface active polymer increases first and then decreases. When the mass ratio of monomer A to monomer B is 7.5:2.5, the viscosity of the surface active polymer reaches the maximum, which is 27.57 mPa·s. Therefore, the optimum mass ratio of monomer A to monomer B is determined to be 7.5:2.5. This is because with the increase of the mass of monomer B, the repulsion between monomer A and monomer B is beneficial to the stretching of the molecular chain, which makes the viscosity of the polymer increase. When the content of monomer B further increases, there will also be a certain steric hindrance between the molecules, which hinders the further expansion of the molecular chain and makes the viscosity of the polymer decrease. Therefore, the optimum mass ratio of monomer A:monomer B is 7.5:2.5.

2. Determination of the Total Amount of Monomer.

Figure 7:
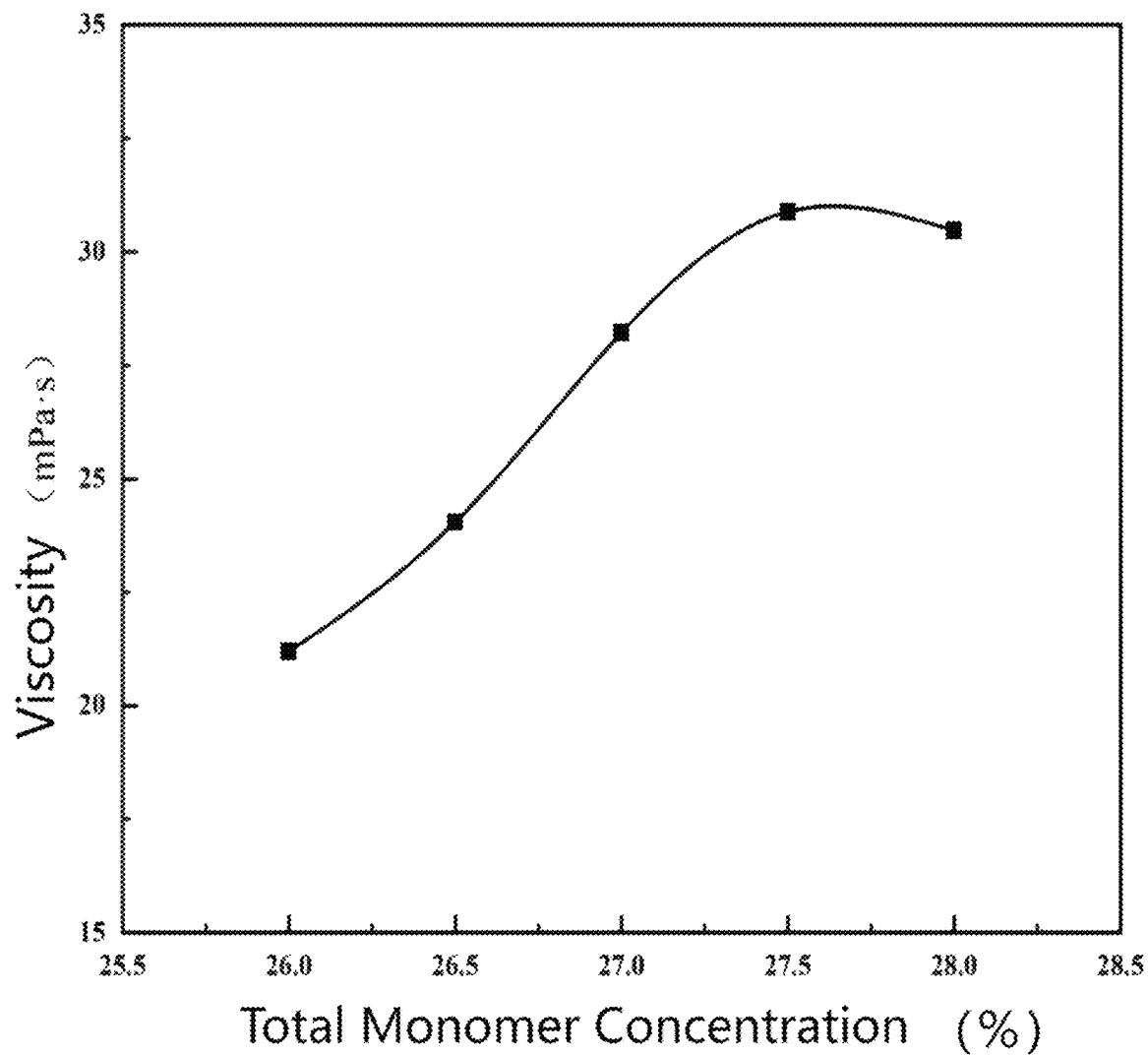
FIG. 7 shows the effect of total monomer concentration on the viscosity of surface active polymer.

The mass ratio of monomer A to monomer B is fixed at 7.5:2.5, the proportion of active monomer C is 6%, the reaction temperature is 47° C., the amount of initiator is 0.6%, and the total concentration of monomer is changed to 26%, 26.5%, 27%, 27.5% and 28%. The viscosity of the surface active polymer under different conditions is investigated, the results are shown in FIG. 7, it can be seen from FIG. 7 that the viscosity of the surface active polymer increases first and then decreases slightly with the increase of the total monomer concentration, when the total monomer concentration increases to 27.5%, the viscosity reaches the maximum. This is because when the total monomer concentration is small, the probability of contact between the monomers is small, the reaction rate is very slow, and the corresponding polymer viscosity is small. Therefore, the increase of the total monomer concentration is beneficial to the viscosity growth of the synthesized polymer. In addition, when the total monomer concentration rises to a certain value, the heat generated by the polymerization reaction cannot be diffused in time, and the high temperature will lead to the breakage of some molecular chains of the polymer, so the viscosity of the polymer has a slight decrease. Therefore, the optimum total monomer concentration is selected as 27.5%.

3. Determination of Initiator Dosage.

Figure 8:
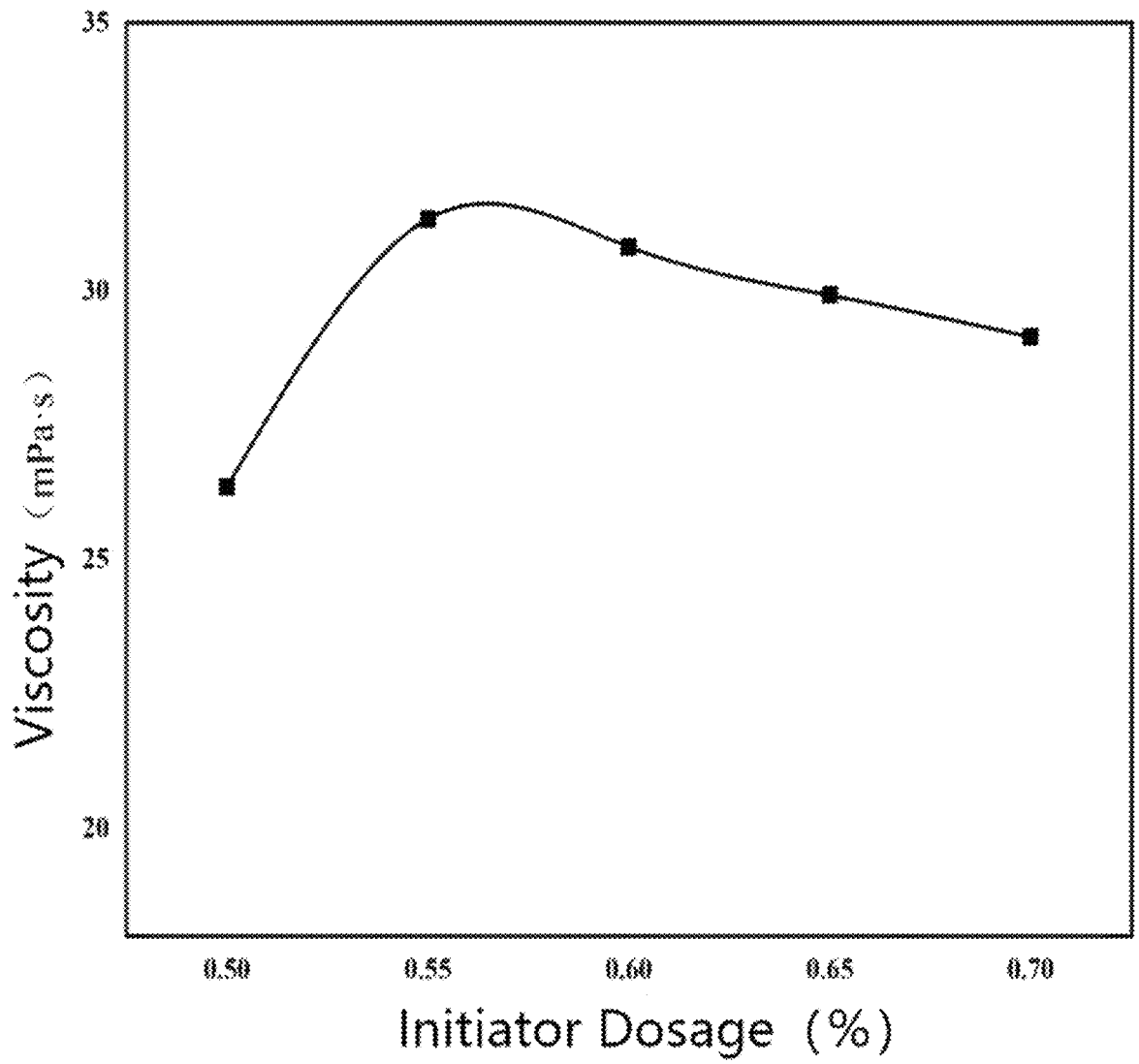
FIG. 8 shows the effect of initiator dosage on the viscosity of surface active polymer.

The mass ratio of monomer A to monomer B is 7.5:2.5, the total monomer concentration is 27.5%, the active monomer C dosage is 6%, the reaction temperature is 47° C., and the initiator dosage is changed to 0.5%, 0.55%, 0.6%, 0.65%, 0.7%. The viscosity of the surface active polymer under different conditions is investigated, it can be seen from FIG. 8 that the viscosity of the surface active polymer increases first and then decreases slowly with the increase of the initiator dosage. When the amount of initiator reaches 0.55%, the viscosity of the surface active polymer reaches the maximum. This is because when the total monomer concentration is constant, increasing the initiator dosage in a certain range can produce more free radicals and improve the polymerization rate; however, the excessive initiator dosage will accelerate the reaction rate, resulting in a decrease in the molecular weight of the synthesized polymer, thereby causing a decrease in the viscosity of the polymer. Therefore, the best initiator dosage is 0.55%.

4. Determination of Active Monomer C Dosage

Figure 9:
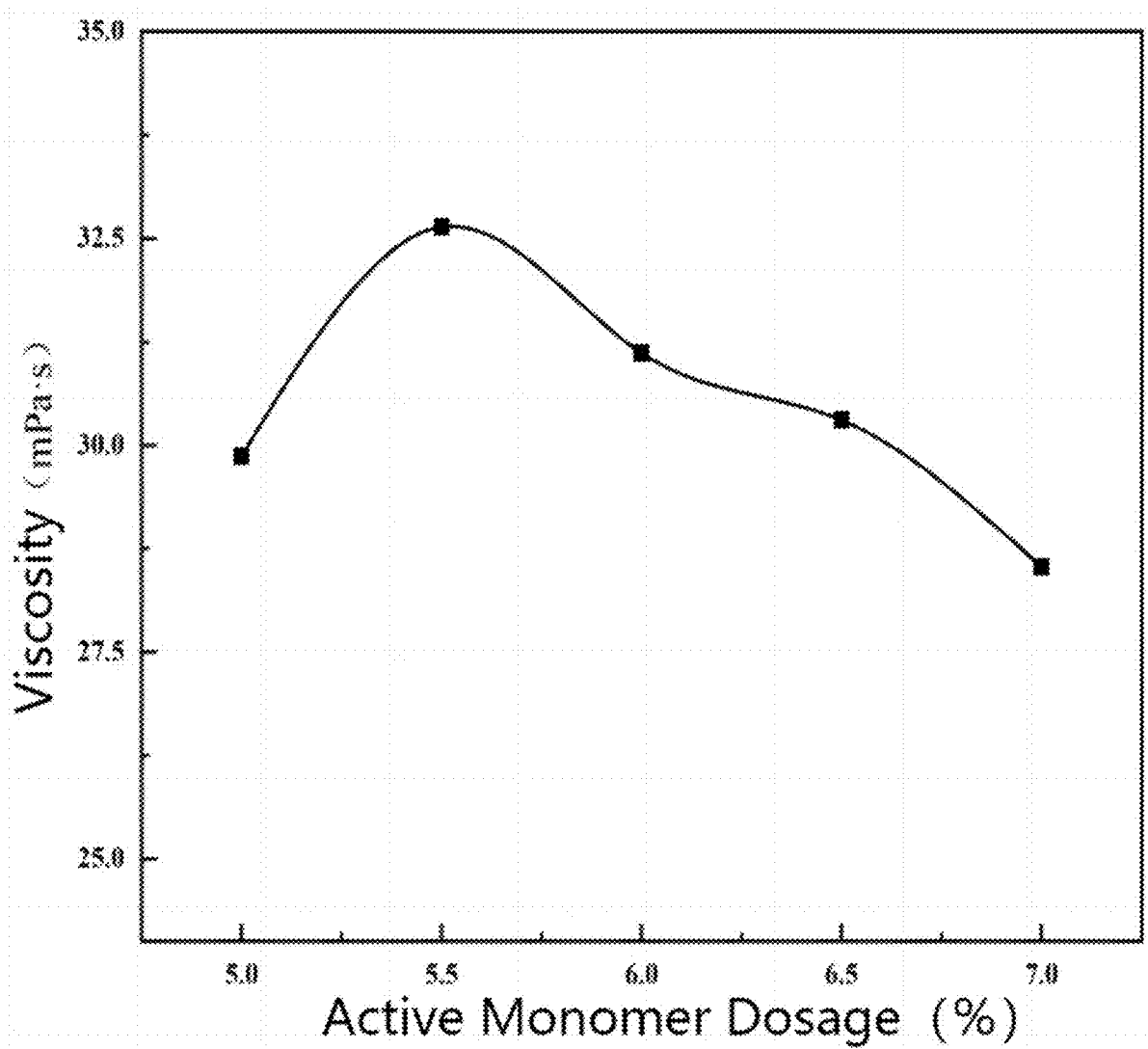
FIG. 9 shows the effect of active monomer dosage on the viscosity of surface active polymer.

The mass ratio of monomer A to monomer B is fixed at 7.5:2.5, the total monomer concentration is 26%, the initiator dosage is 0.55%, the reaction temperature is 49° C., and the active monomer C dosage is changed to 5%, 5.5%, 6%, 6.5%, 7%. The effect of active monomer C dosage on the viscosity of surface active polymer is investigated, the experimental results are shown in FIG. 9, it can be seen that with the increase of active monomer C dosage, the viscosity of the polymer increases first and then decreases. When the functional monomer dosage is 5.5%, the viscosity reaches the maximum, the analysis shows that the functional monomer has a long hydrophobic carbon chain, and the increase of the functional monomer dosage can enhance the hydrophobic effect of the polymer, resulting in an increase in the viscosity of the polymer. However, when functional monomer dosage is further increased, the polymerization between monomer A and monomer B will be affected, and a certain polymerization inhibition phenomenon will occur, resulting in a decrease in the viscosity of the polymer. Therefore, the optimum active monomer C dosage is 5.5%.

5. Determination of Reaction Temperature

Figure 10:
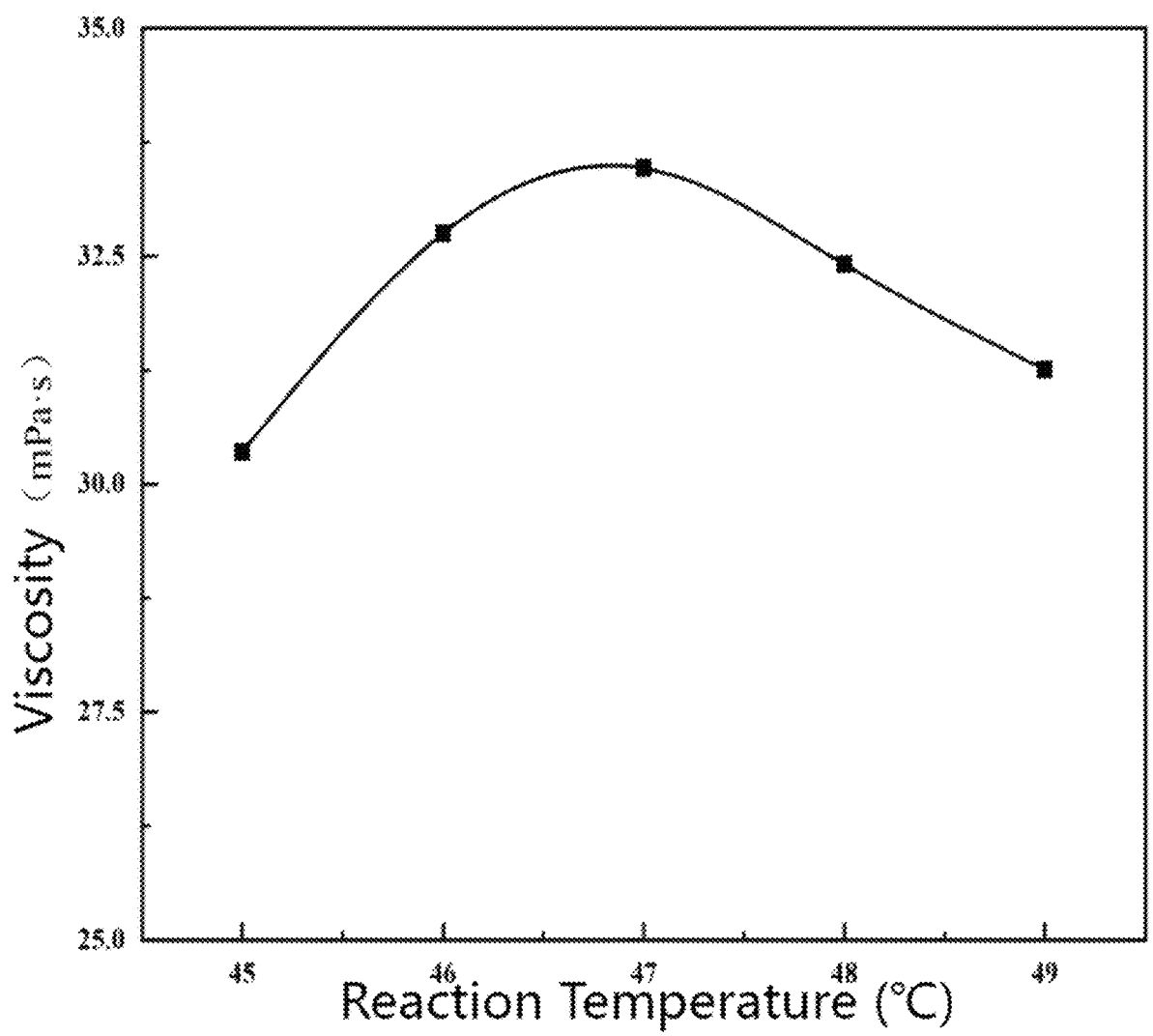
FIG. 10 shows the effect of reaction temperature on the viscosity of surface active polymer.

The mass ratio of monomer A to monomer B is fixed at 7.5:2.5, the total monomer concentration is 26%, the initiator dosage is 0.55%, and the active monomer C dosage is 5.5%, the reaction temperature is changed to 45° C., 46° C., 47° C., 48° C. and 49° C., and its effect on the viscosity of the polymer is investigated, the experimental results are shown in FIG. 10, it can be seen that the polymer can be polymerized in the set temperature range, and with the increase of temperature, the viscosity increases first and then decreases, the viscosity is the largest when the temperature is at 47° C., and the overall change is not large. This is because the increase of temperature can promote the decomposition of initiator, accelerate the polymerization rate and increase the viscosity of polymer. However, excessively high temperature is prone to explosive polymerization, which leads to the acceleration of chain termination rate and the decrease of polymer viscosity. Therefore, the optimum reaction temperature is 47° C.

In summary, the optimum synthesis conditions of the above surface active polymer are obtained by single factor test method: the mass ratio of monomer A to monomer B is 7.5:2.5, the total monomer concentration is 27.5%, the initiator dosage is 0.55%, the functional monomer dosage is 5.5%, and the reaction temperature is 47° C.

Embodiment 4 Study on the Properties of Surface Active Polymer Solution

1. Effect of Ambient Temperature on the Viscosity of Surface Active Polymer.

Figure 11:
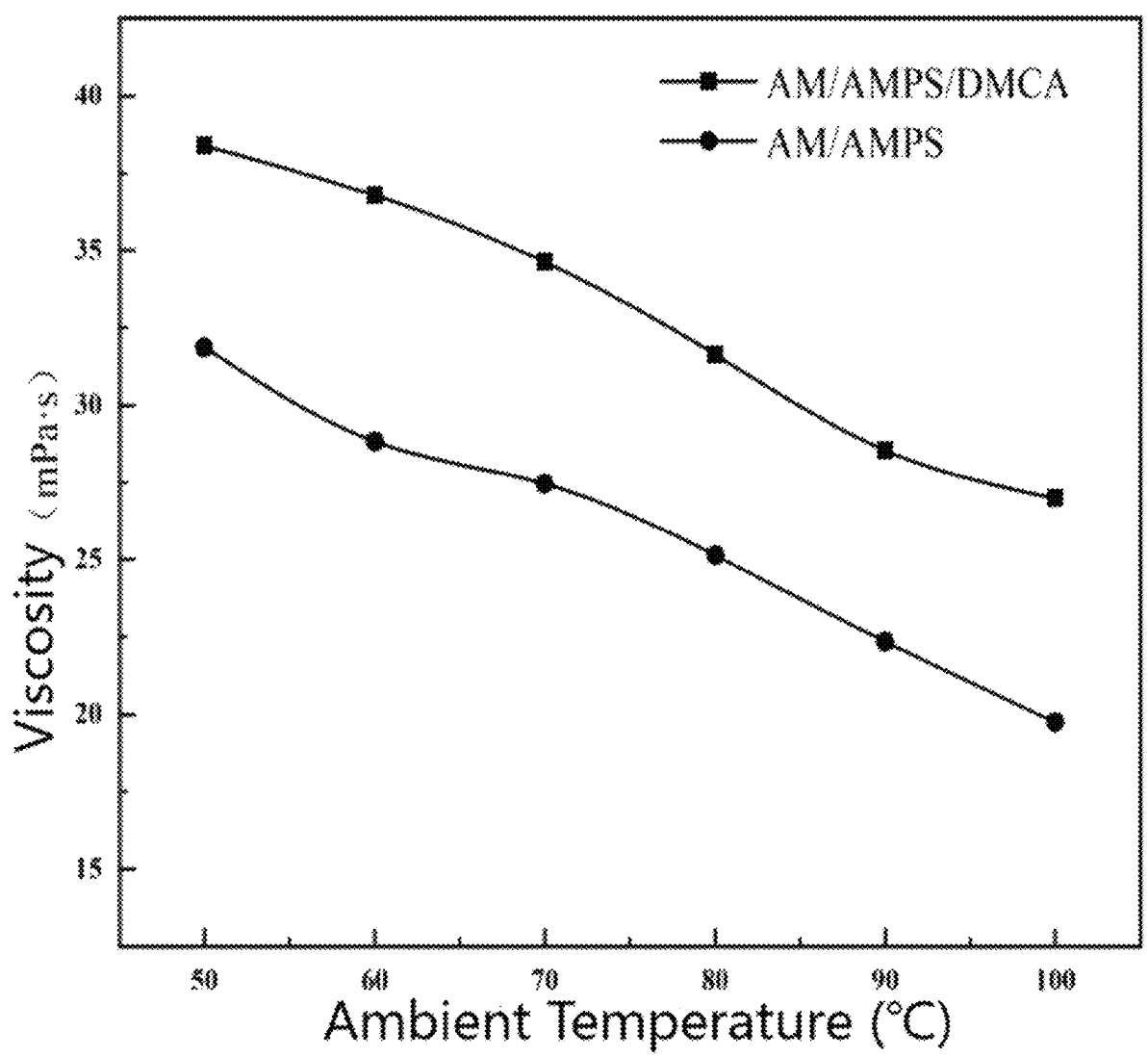
FIG. 11 shows the effect of ambient temperature on the viscosity of surface active polymer.

The specific experimental process is as follows: 0.2% surface active polymer solution is prepared with simulated formation water and placed at 50° C., 60° C., 70° C., 80° C., 90° C. and 100° C. The viscosity is measured by Brookfield DV-III viscometer and compared with conventional binary polymer AM/AMPS, the results are shown in FIG. 11, AM/AMPS/DMCA in the figure is surface active polymer. It can be seen from FIG. 11 that the viscosity of the surface active polymer AM/AMPS/DMCA and the binary polymer AM/AMPS decreases with the increase of temperature, and the decreasing trend of the two is not much different. Because the increase of temperature can accelerate the thermal movement of water molecules in the hydration layer, weaken the hydration effect of hydrophilic groups, and curl the polymer molecular chain; the temperature rising will also aggravate the thermal motion of the hydrophobic chain and weaken the hydrophobic association between the polymer molecules. At the same time, the high temperature will also cause the network structure of the polymer solution to partially collapse, resulting in a decrease in the viscosity of the polymer solution. At the same temperature, the viscosity of the surface active polymer is higher than that of AM/AMPS polymer, the viscosity at 100° C. is 26.98 mPa·s, which is higher than that of AM/AMPS polymer 19.75 mPa·s, the viscosity retention rate at 50° C. is 70.28%, and the temperature resistance is good. This is because compared with AM/AMPS, the surface active polymer contains hydrophobic long chains, and there are not only hydrogen bonds between molecules, but also hydrophobic associations, which increases the temperature resistance of the polymer to a certain extent.

2. Effects of Different Valence Metal Ions on the Viscosity of Surface Active Polymer.

There are various types of metal ions in the actual oil reservoir formation water, which will have a greater impact on the viscosity of the polymer, thus affecting the oil displacement effect. At present, the viscosity of the polymer is mainly affected by $Na^+$, $Ca^{2+}$ and $Mg^{2+}$. Therefore, in this section, the effects of different concentrations of NaCl, $CaCl_2$ and $MgCl_2$ on the viscosity of the surface polymer are investigated and compared with the binary polymer AM/AMPS.

(1) The Effect of NaCl Concentration

Figure 12:
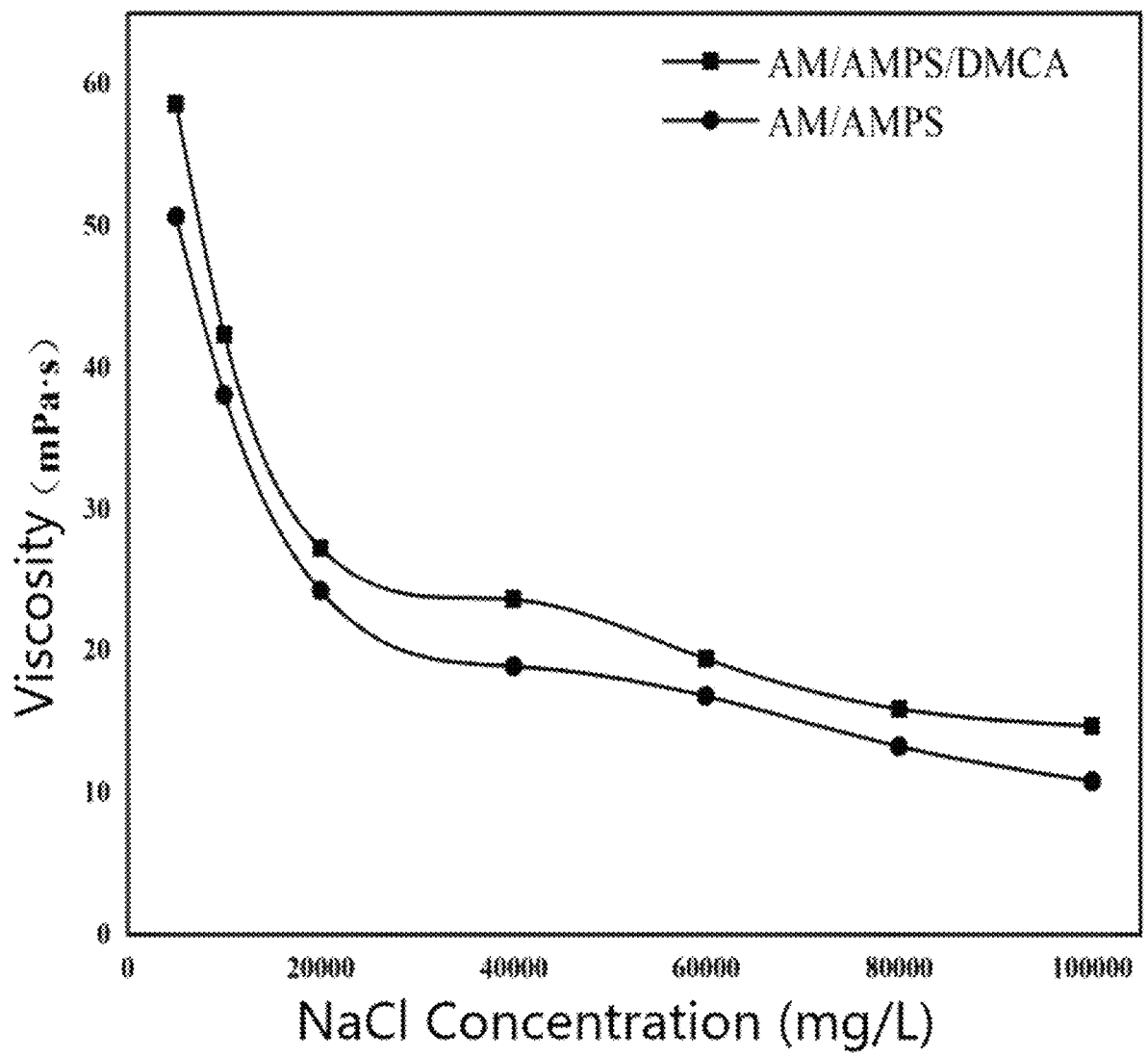
FIG. 12 shows the effect of NaCl concentration on the viscosity of surface active polymer.

The surface active polymer and the conventional binary polymer AM/AMPS solution with a concentration of 0.2% at different NaCl concentrations (5000, 10000, 20000, 40000, 60000, 80000, 100000 mg/L) are prepared, the viscosity is measured by BrookFieldDV-III viscometer at 65° C., the experimental results are shown in FIG. 12, it can be seen from FIG. 12 that the viscosity of the surface active polymer and conventional binary polymer AM/AMPS decreases with the increase of NaCl concentration. Because the cation in the inorganic salt will replace the water molecule and the carboxyl group on the polymer chain, thereby the electrostatic repulsion of the anion will be shielded and the dehydrant effect will occur, resulting in the curl of the polymer molecular chain, the molecular size of the polymer is reduced microscopically, and the viscosity of the polymer is reduced macroscopically. At the same time, inorganic ions can change the polarity of the polymer solution and hinder the solvent of the polymer, so as to reduce the viscosity of the polymer. It can be seen from FIG. 12 that when the amount of NaCl addition is less than 20000 mg/L, the viscosity of the surface active polymer decreases greatly; when the concentration of NaCl is more than 20000 mg/L, the viscosity decreases slowly. Under the same conditions, the viscosity of the surface active polymer is always higher than that of the binary polymer AM/AMPS, under the condition of 100000 mg/L NaCl concentration, the viscosity of the surface active polymer is 14.7 mPa·s, while the viscosity of the AM/AMPS polymer is 10.8 mPa·s, indicating that the surface active polymer has better NaCl resistance.

(2) The effect of $CaCl_2$ Concentration.

Figure 13:
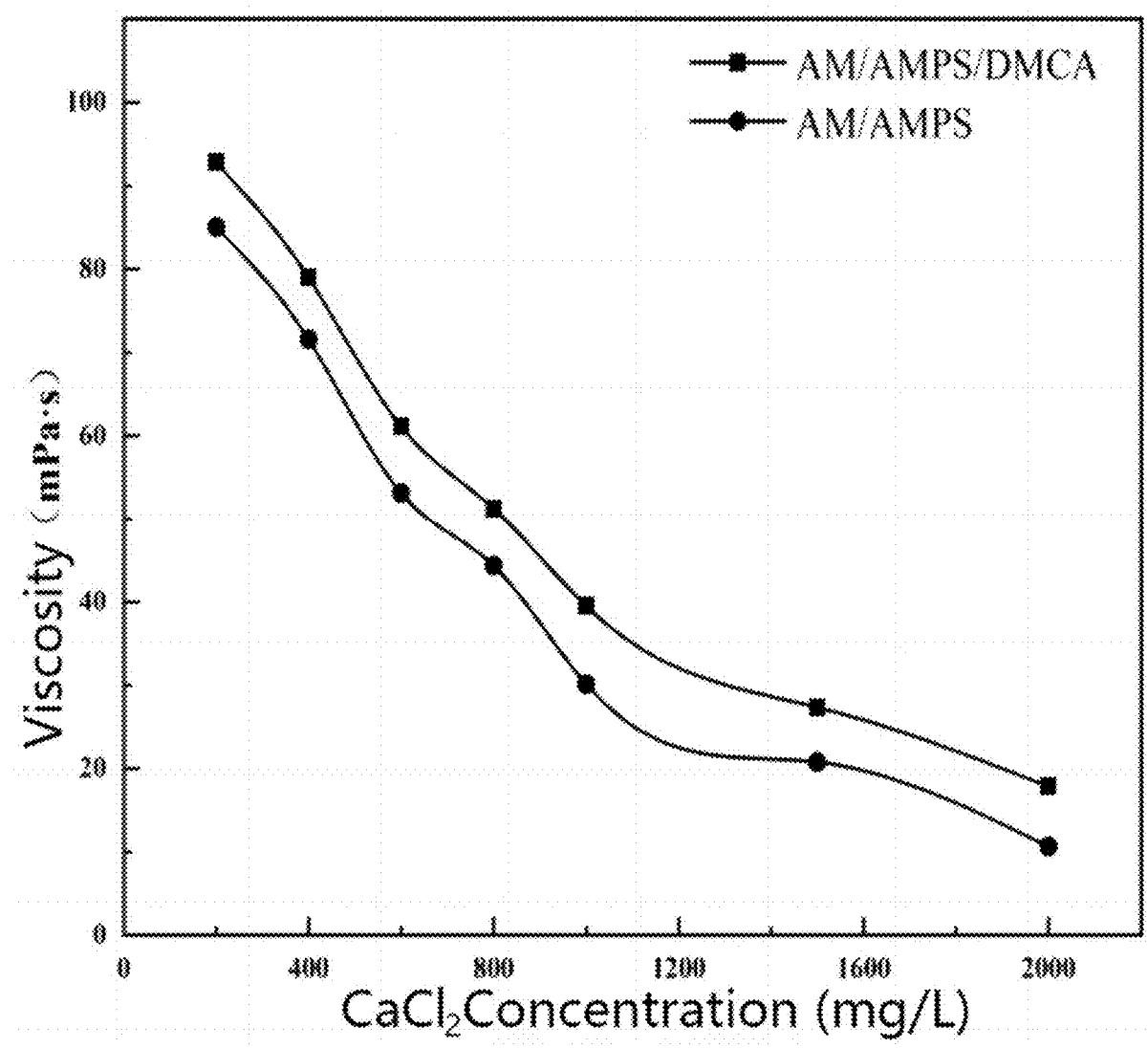
FIG. 13 shows the effect of $CaCl_2$ concentration on the viscosity of surface active polymer.

The surface active polymer and the AM/AMPS polymer solution with a concentration of 0.2% at different $CaCl_2$ concentrations (200, 400, 600, 800, 1000, 1500 mg/L) is measured at 65° C., the results are shown in FIG. 13, it can be seen from FIG. 13 that the viscosity of the surface active polymer and AM/AMPS decreases with the increase of the amount of $CaCl_2$. At the same time, it can be seen that the viscosity of the surface active polymer decreases less than that of the binary polymer AM/AMPS, when the concentration of $CaCl_2$ is 2000 mg/L, the viscosity of the surface active polymer is 17.8 mPa·s, which is higher than that of AM/AMPS 10.6 mPa·s, indicating that the surface active polymer exhibits better resistance to $CaCl_2$.

(3) The effect of $MgCl_2$ Concentration.

Figure 14:
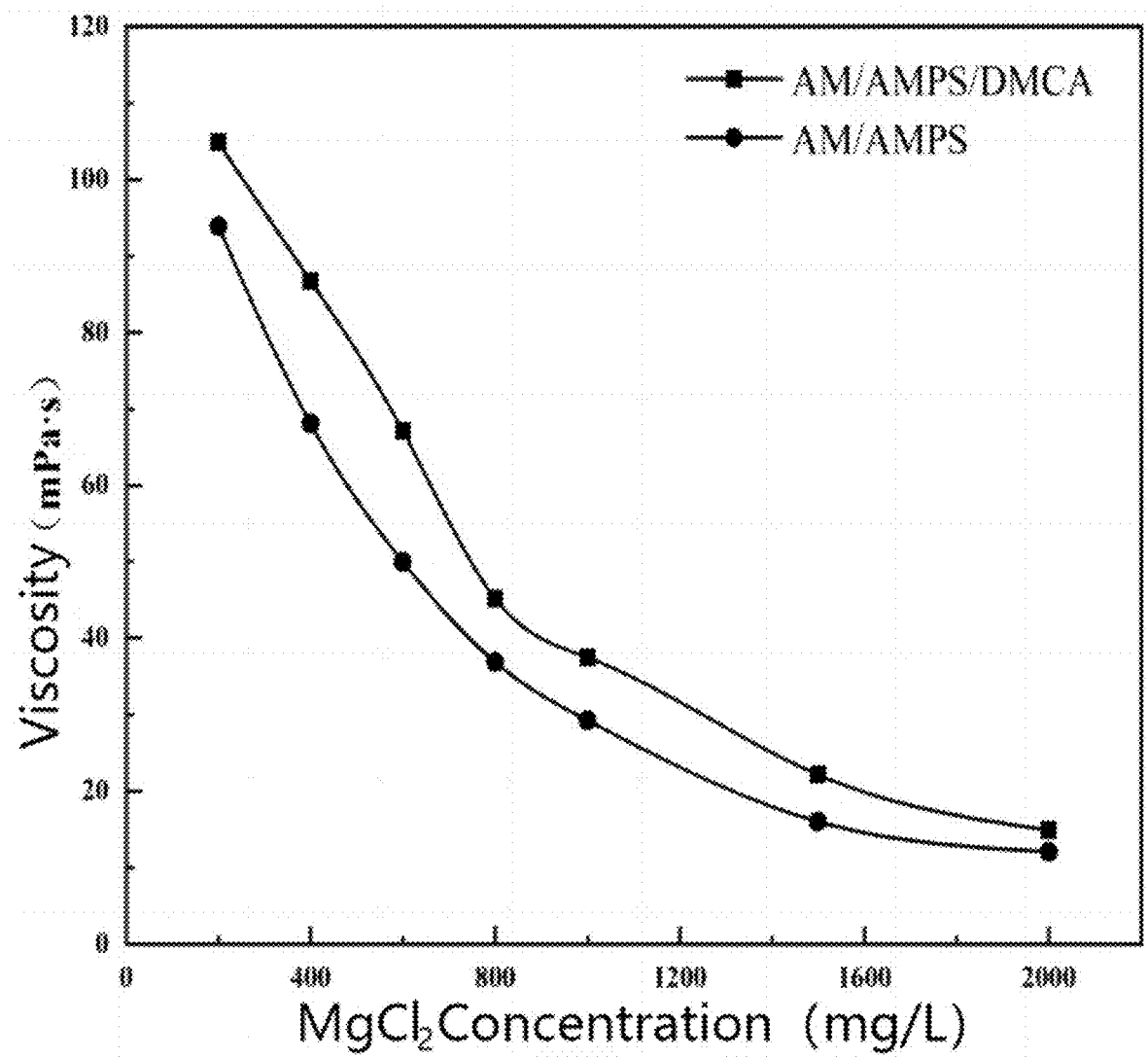
FIG. 14 shows the effect of $MgCl_2$ concentration on the viscosity of surface active polymer.

The surface active polymer and AM/AMPS polymer solution with the concentration of 0.2% at different $MgCl_2$ concentrations (200, 400, 600, 800, 1000, 1500 mg/L) are prepared, and the viscosity is measured at 65° C. The experimental results are shown in FIG. 14, it can be seen from FIG. 14 that the effect of $MgCl_2$ dosage on the viscosity of surface active polymer and AM/AMPS polymer solution is similar. When the $MgCl_2$ dosage is 1500 mg/L, the viscosity of 2000 mg/L surface active polymer and AM/AMPS polymer is 14.9 and 12.1 mPa·s respectively, indicating that the surface active polymer also shows better resistance to $MgCl_2$.

Figure 15:
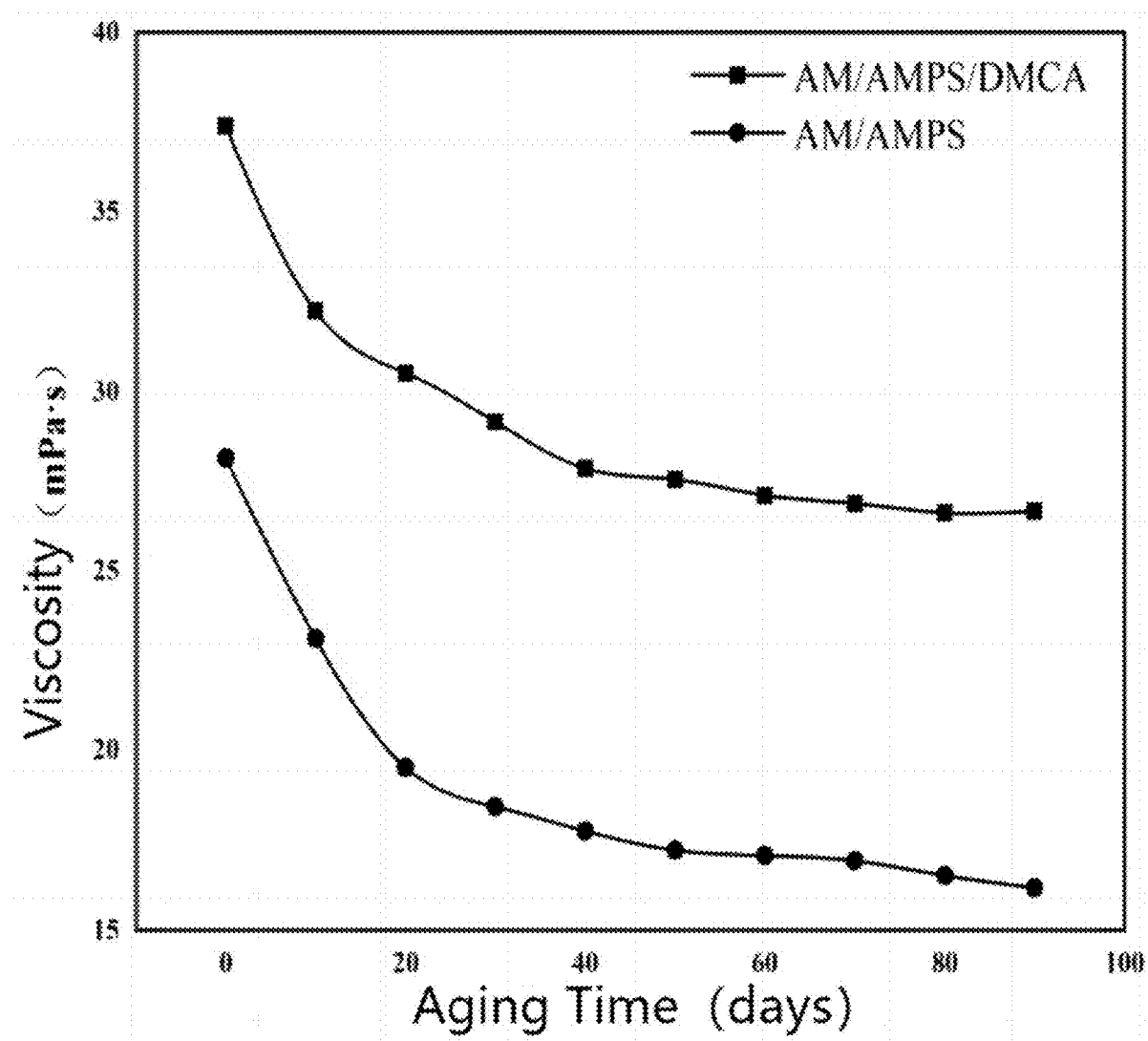
FIG. 15 shows the effect of aging time on the viscosity of surface active polymer.

3. Effect of Aging Time on Viscosity of Surface Active Polymer 0.2% of surface active polymer and binary polymer AM/AMPS are prepared with simulated formation water, and they are placed in an oven at 65° C., their viscosity is measured every 10 days to investigate the long-term stability of the polymer, the experimental results are shown in FIG. 15, it can be seen from FIG. 15 that the viscosity of the surface active polymer and the binary polymer AM/AMPS has a similar trend with the aging time, both of which decrease rapidly and then remain stable. The long-term stability of AM/AMPS/DMCA is significantly better than that of AM/AMPS. After 90 days, the viscosity of the surface active polymer is 26.68 mPa·s, and the viscosity retention rate reaches 71.34%, showing good anti-stability performance. Under the same conditions, the viscosity of binary polymer AM/AMPS after 90 days of aging is 16.18 mPa·s, and the viscosity retention rate is 57.46%.

Embodiment 5 Study on Oil Displacement Efficiency of Composite Displacement System 1. Slug Combination Optimization.

Figure 16:
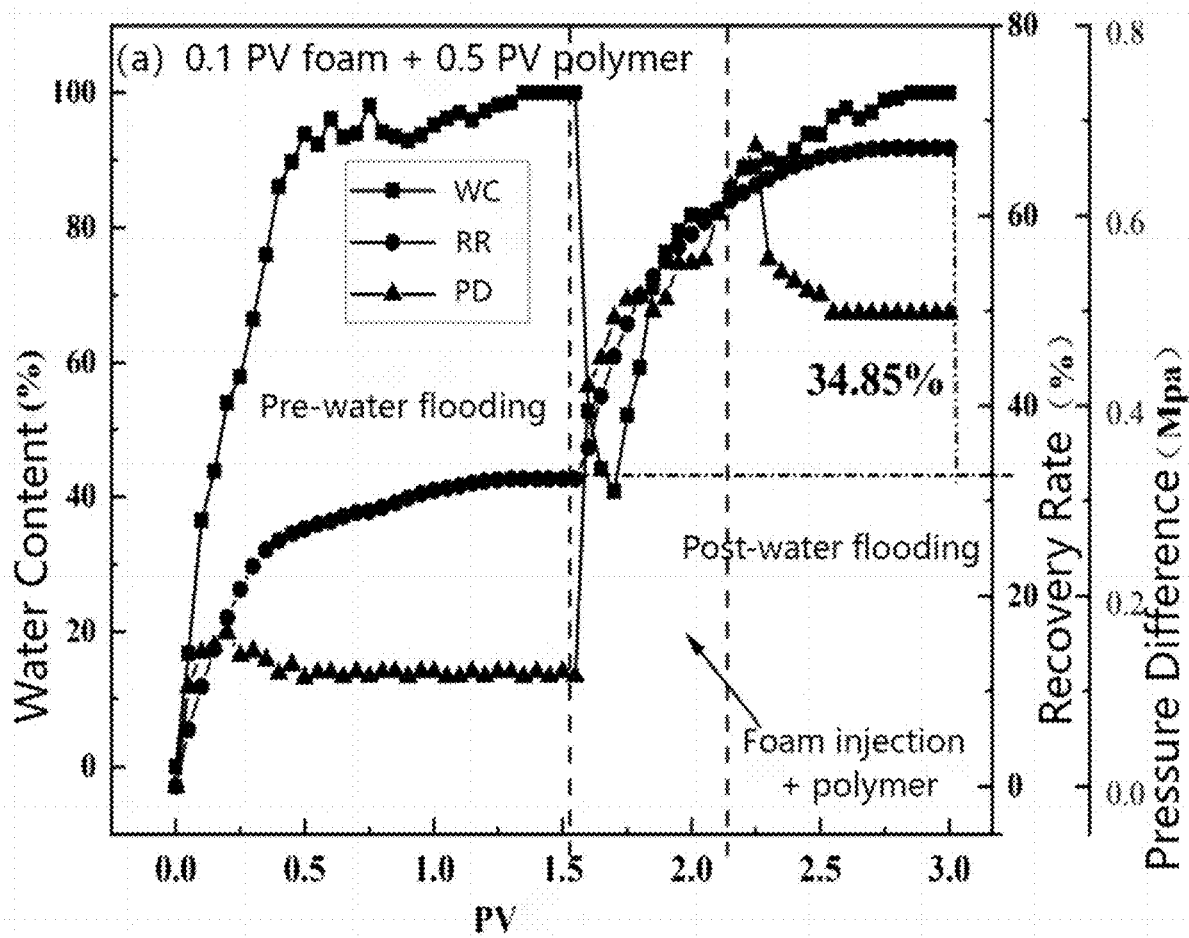
FIG. 16 is the water content, recovery rate and pressure difference curve chart of displacement process of 0.1 PV enhanced foam+0.5 PV active polymer.
Figure 17:
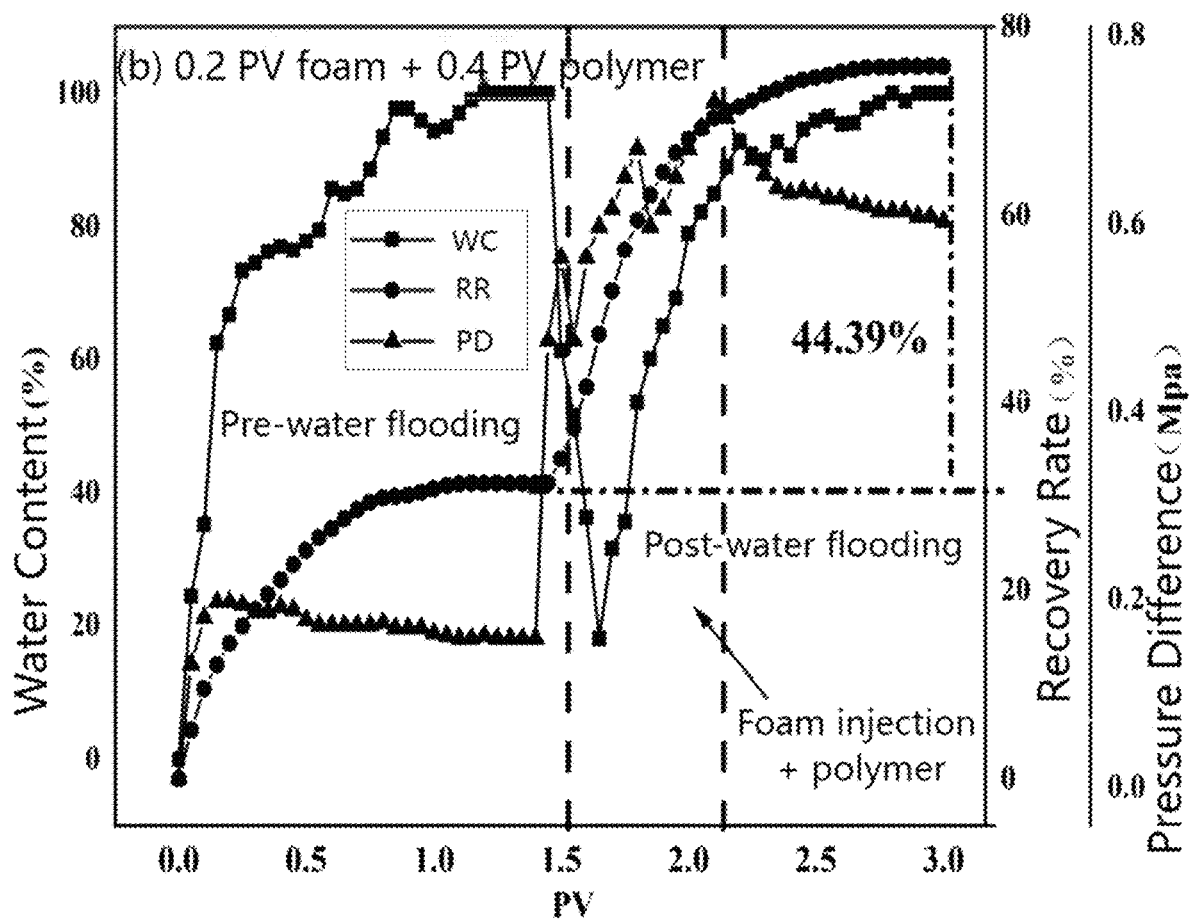
FIG. 17 is the water content, recovery rate and pressure difference curve chart of displacement process of 0.2 PV enhanced foam+0.4 PV active polymer.
Figure 18:
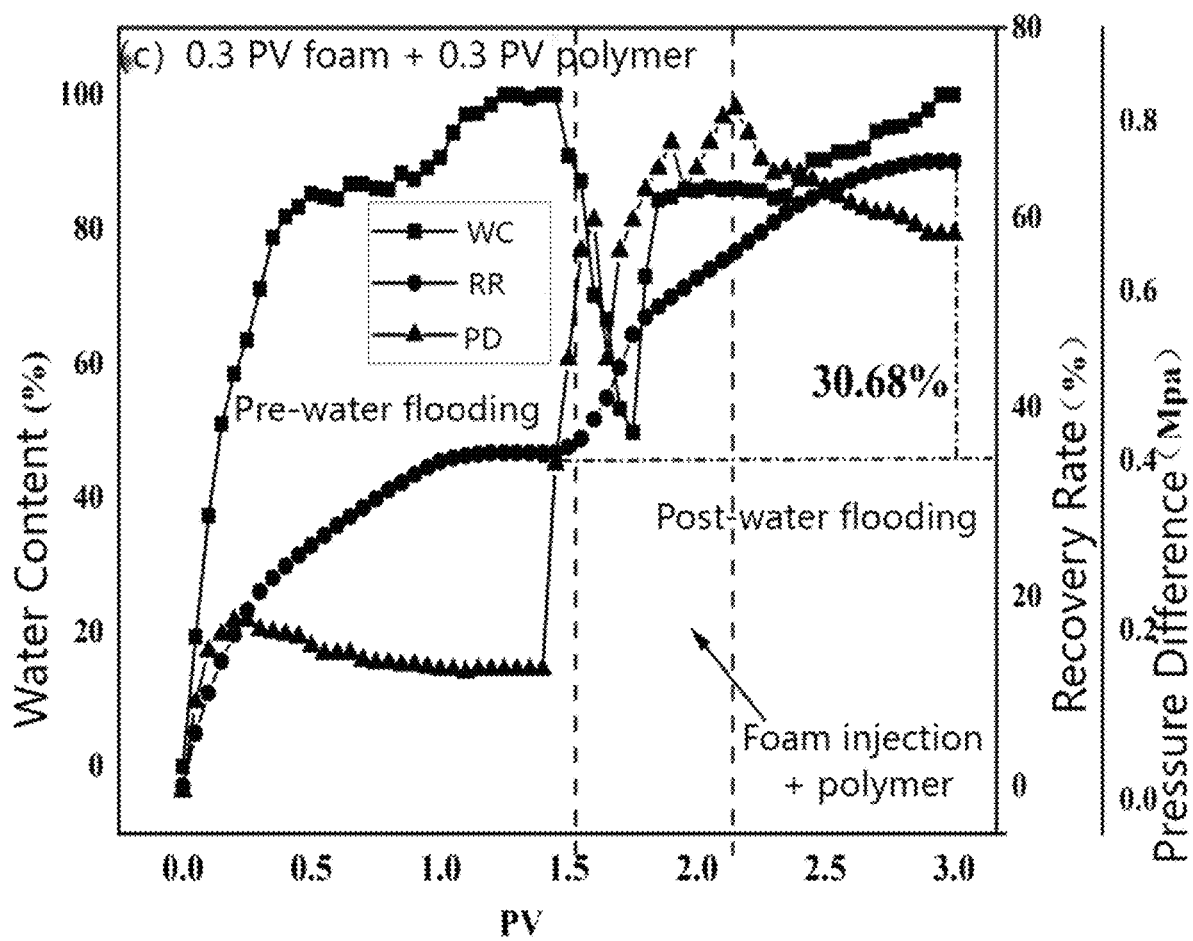
FIG. 18 is the water content, recovery rate and pressure difference curve chart of displacement process of 0.3 PV enhanced foam+0.3 PV active polymer.
Figure 19:
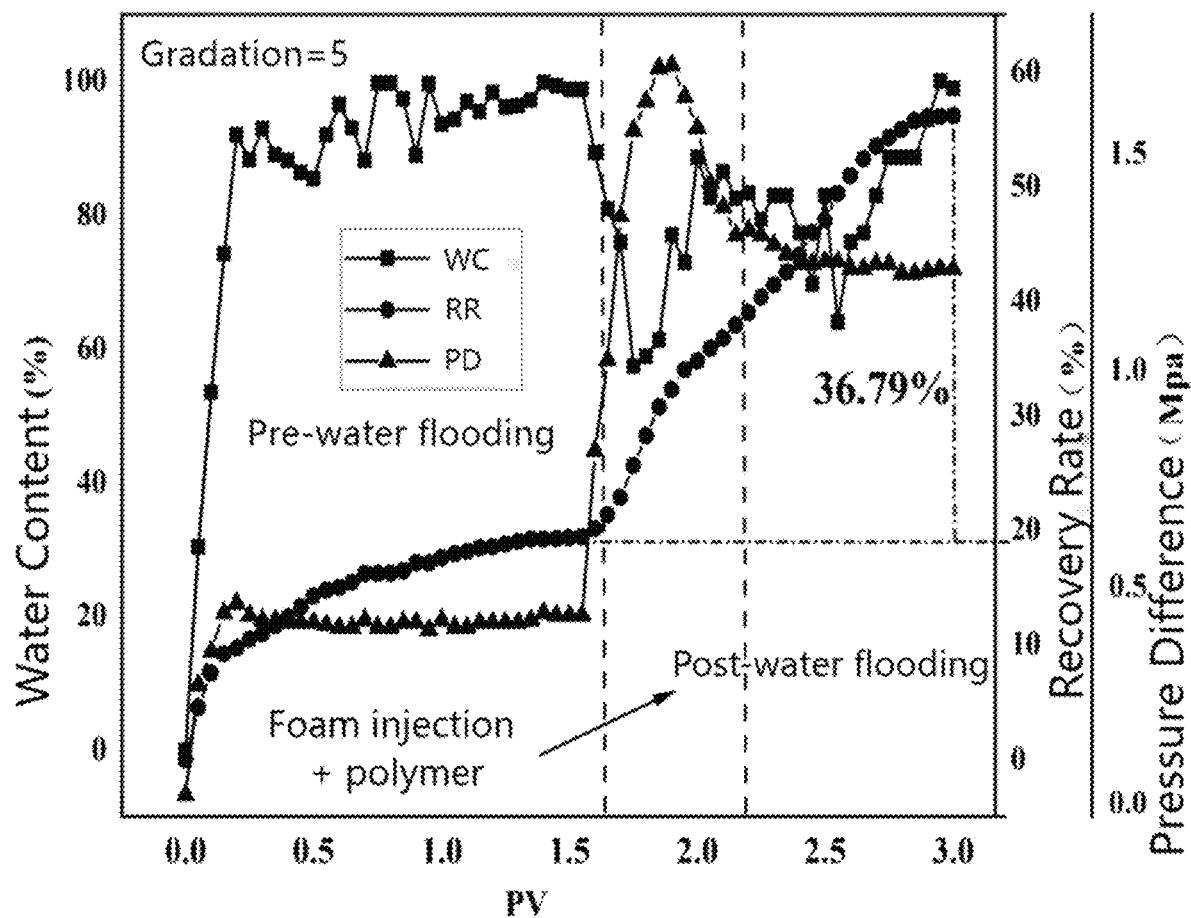
FIG. 19 is the water content, recovery rate and pressure difference curve chart of the displacement process of the displacement system when the gradation is 5.
Figure 20:
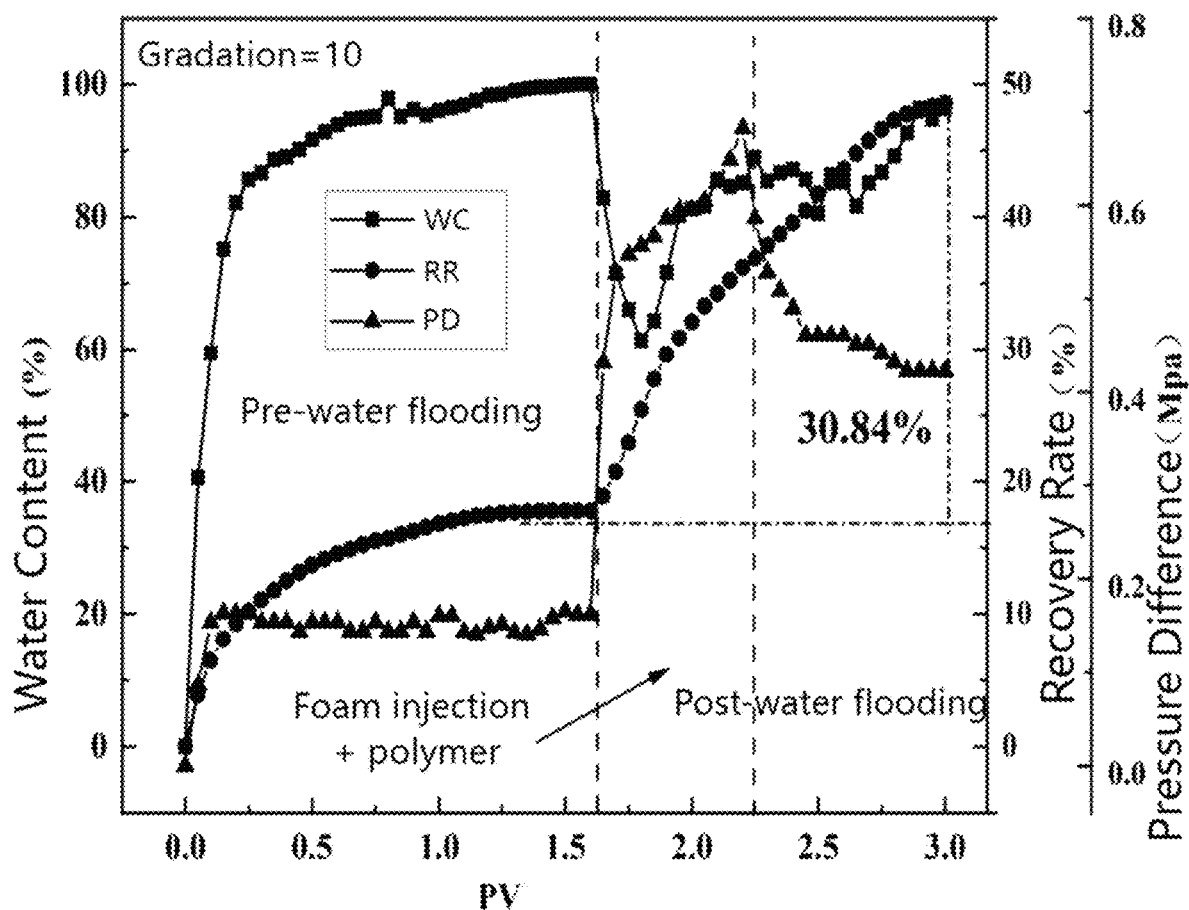
FIG. 20 is the water content, recovery rate and pressure difference curve chart of the displacement process of the displacement system when the gradation is 10.
Figure 21:
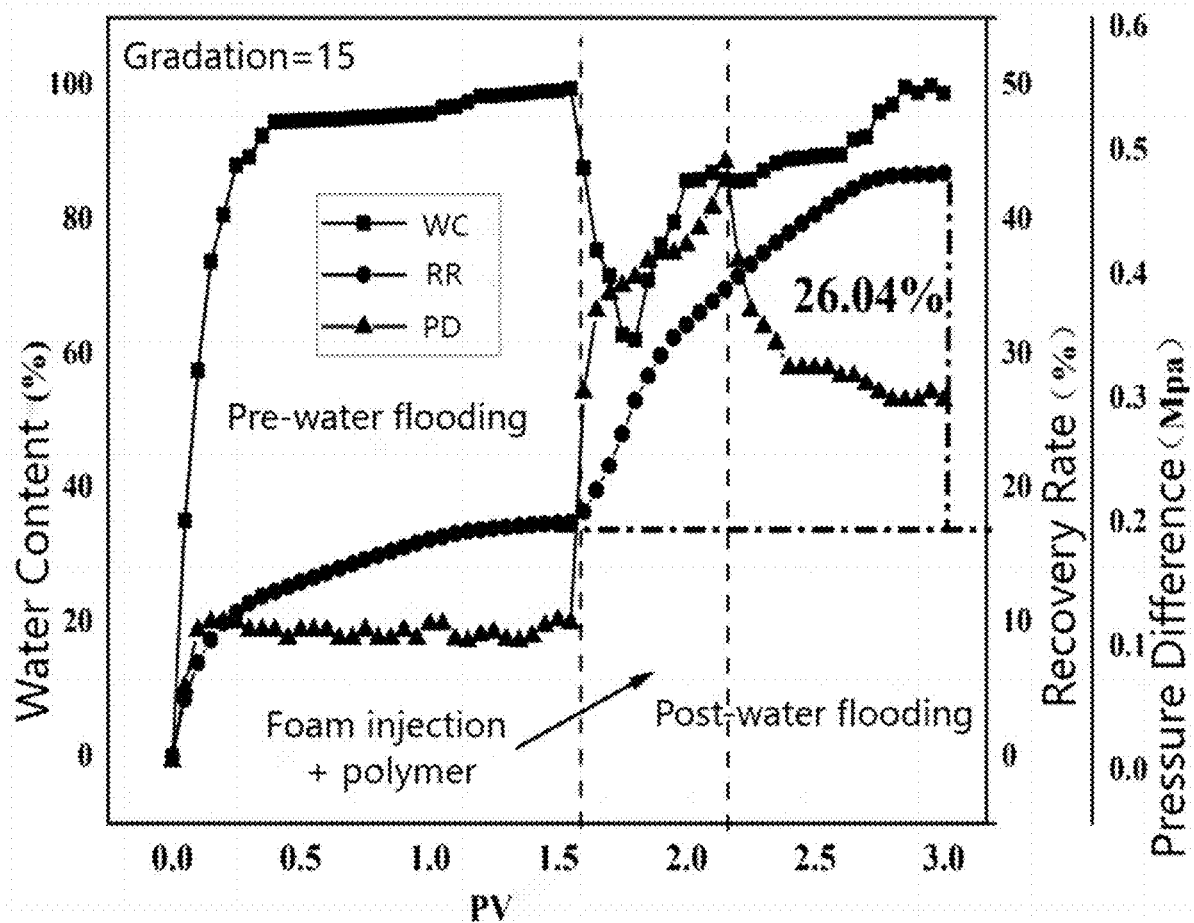
FIG. 21 is the water content, recovery rate and pressure difference curve chart of the displacement process of the displacement system when the gradation is 15.
Figure 22:
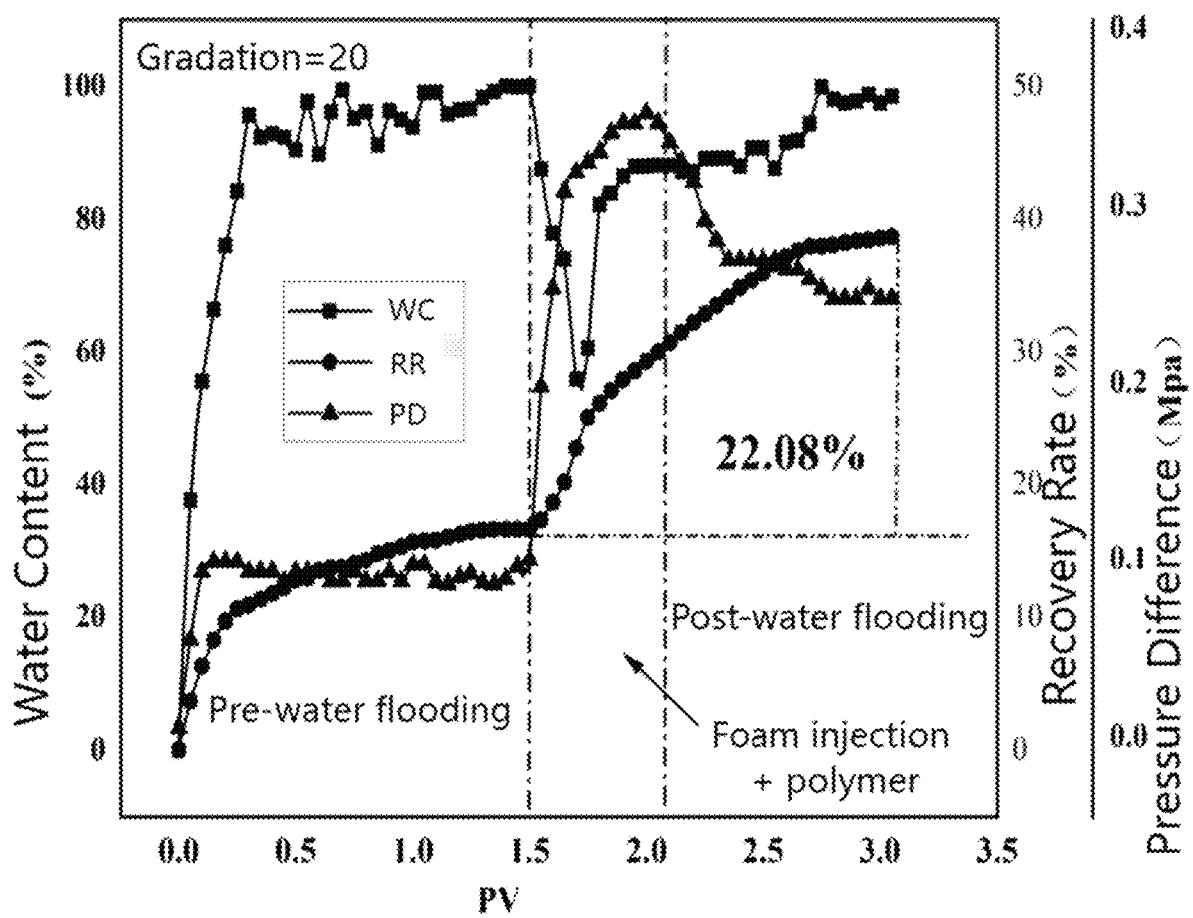
FIG. 22 is the water content, recovery rate and pressure difference curve chart of the displacement system when the gradation is 20.
Figure 23:
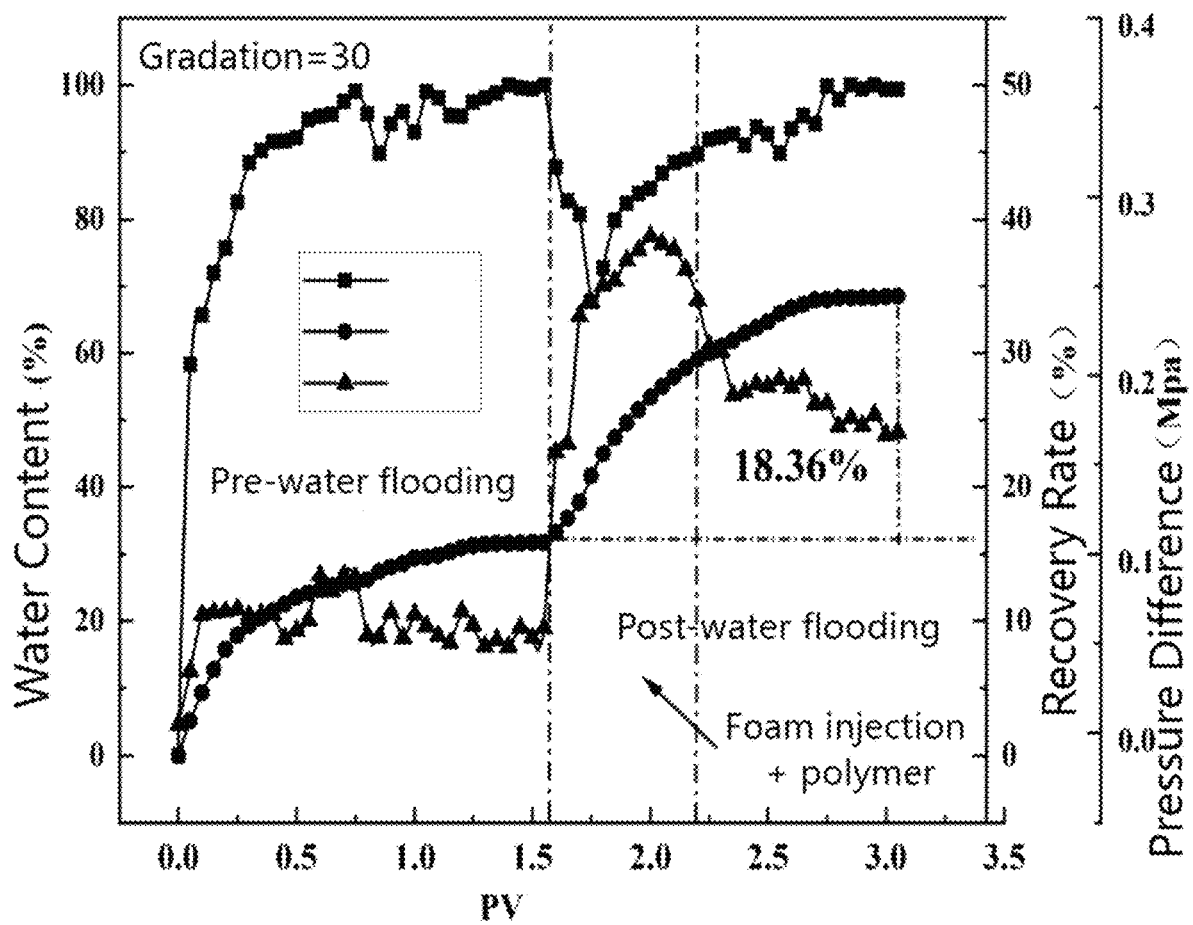
FIG. 23 is the water content, recovery rate and pressure difference curve chart of the displacement system when the gradation is 30.

The specific experimental process is as follows: (1) after the core is dried completely in the oven, the parameters such as diameter, length and dry weight are measured, and the simulated formation water is saturated into the core under vacuum suction filtration for 12 h, the wet weight is weighed and the core porosity is calculated; (2) pre-water flooding: the simulated formation water is injected into the core at a flow rate of 1 mL/min, and the pressure value is recorded in real time until the pressure value is stable, then the pump is stopped, the stable pressure value is recorded as AP, and the core permeability is calculated according to Darcy's formula (Formula 1); (3) saturated oil: the crude oil is saturated at a rate of 0.1 mL/min at 65° C., until the outlet end is no longer out of oil, stop saturation, the amount of saturated oil is recorded, and it is aged at 65° C. for 48 h; (4) pre-water flooding: the simulated formation water is injected into the core at a flow rate of 1 mL/min to replace the crude oil, and the water content at the outlet end is recorded in real time until the water content reaches 98%, and then the pump is stopped; (5) system drive: firstly, the total slug is fixed as 0.6 PV, and the slug combination of the experiment is set as: 0.1 PV AOS-DYG+0.5 PV surface active polymer; 0.2 PV AOS-DYG+0.4 PV surface active polymer and 0.3 PV AOS-DYG+0.3 PV surface active polymer, and they are injected into the displacement slug at a certain speed, and the pump is stopped after the corresponding PV number is injected; (6) post-water flooding: the simulated formation water is continued to displace crude oil at a displacement rate consistent with the system until the water content of the produced liquid reaches 98%, the experiment is stopped, and the degree of enhanced oil recovery rate (Formula 2) is calculated. The distribution of water content, recovery rate and pressure difference curves of composite displacement system of different slug combinations are shown in FIG. 16, FIG. 17 and FIG. 18.

It can be seen that when the slug combination is 0.2 PV AOS-DYG enhanced foam+0.4 PV surface active polymer, the oil displacement efficiency is the highest in the square rock core with a gas permeability of 1200 mD, the composite displacement system and post-water flooding increase the oil recovery rate by 44.39%, and the final oil recovery rate reaches 75.78%. By comparing the three groups of experiments, it can be seen that in the first group of slug combination, the crude oil recovery rate is 8.76% higher than that of water flooding when 0.1 PV enhanced foam is injected. In the second group, the oil recovery rate after injection of 0.2 PV enhanced foam is 10.69% higher than that of water flooding. In the third group, the oil recovery rate after injection of 0.3 PV enhanced foam is 12.48% higher than that of water flooding, indicating that the main role of enhanced foam in the whole displacement process of the composite displacement system is not oil displacement, but to adjust the water absorption profile. It can also be seen from FIG. 16-18 that the injection pressure difference in the slug combination of 0.3 PV enhanced foam+0.3 PV active polymer increases the most during the displacement process, reaching a maximum of 0.81 MPa, on the contrary, the water content in the 0.2 PV enhanced foam+0.4 PV active polymer slug combination decreases the fastest (the lowest water content is 18.01%). This is because when the injection slug of the enhanced foam is too small, the large pores in the core cannot be effectively blocked, and the sweep efficiency is small, so the subsequent oil displacement effect of active polymer cannot be fully utilized; when the injection slug of the enhanced foam is too large, the plugging effect in the core is too strong, and some small pores are blocked, resulting in poor injectability of the subsequent active polymer, and thus the ultimate enhanced oil recovery capacity is reduced.

$$K = \frac{Q\mu L}{\Delta P} \quad \text{(Formula 1)}$$

Wherein K is permeability, D; Q is the injection flow rate during pre-water flooding, mL/min; μ is the viscosity of injection water, mPa·s; A is the cross-sectional area of the core used in the experiment, $cm^2$; ΔP is the stable pressure difference at the end of the experiment, MPa.

$$EOR = E_t - E_w \quad \text{(Formula 2)}$$

Wherein EOR is oil recovery rate enhanced by polymer displacement, %; Et is the cumulative oil recovery rate enhanced by water flooding and polymer displacement, %; Ew is the oil recovery rate enhanced by pre-water flooding crude, %.

2. The Effect of Different Permeability Gradation.

The oil displacement efficiency of the composite displacement system optimized in the above sections is investigated in the heterogeneous square cores with permeability gradations of 5, 10, 15, 20 and 30 respectively, the experimental results are shown in FIG. 19-23, it can be seen that when the permeability gradation is 5, the degree of recovery rate enhanced by 0.2 PV AOS+DYG enhanced foam+0.4 PV surface active polymer can reach 36.79%. However, when the permeability of low permeability core is fixed and the permeability gradation is further increased, the degree of recovery rate enhanced by composite displacement system and subsequent water flooding decreases gradually. It can be seen from FIG. 19-23 that the greater the permeability difference, the lower the injection pressure difference of the composite displacement system in the core, and the lower the resistance of the system established in the core, which is not conducive to expanding the sweep efficiency and improving oil recovery. When the permeability difference is 20, the oil displacement efficiency of the composite displacement system can increase by 22.08%, when the permeability difference is further increased to 30, the composite displacement system can still increase the recovery rate by 18.36%, indicating that the composite displacement system has a good adaptability of strong heterogeneous oil reservoir. This is because in the heterogeneous core, the injection water in the pre-water flooding stage mainly enters the high-permeability area of the core, and the oil saturation of the high-permeability layer decreases after the end of the water flooding, while the foam has the characteristics of 'plugging large instead of plugging small, encountering water is stable, encountering oil is to eliminate foam'. Then the entered foam will preferentially enter the high-permeability layer, increase the flow resistance of the high-permeability layer, play the role of plugging, and increase the swept volume, so that the subsequent active polymer and post-water can enter the low-permeability layer of the core and start the residual oil in the low-permeability layer that is not used during the water flooding process, thereby increasing oil recovery rate.

What is claimed is:

1. A composite displacement system for strong heterogeneous oil recovery, including a polymer enhanced foam and a surface active polymer, the polymer enhanced foam including the following components: a foaming agent a-olefin sulfonate (AOS) 0.4 wt % and a foam stabilizer biological polysaccharide diutan gum (DYG) 0.12 wt %, wherein the polymer enhanced foam system is prepared by the following steps:

preparing a foam stabilizer solution with a mass ratio of 0.12%, and adding the foaming agent a-olefin sulfonate with a mass ratio of 0.4% to a solution to prepare a polymer enhanced foam base solution and then transferring it to a foaming device; after introducing nitrogen, stirring it at a speed of 6000 r/min for 1 min to obtain a polymer enhanced foam system;

an active polymer flooding agent is prepared by the following steps: (1) mixing a monomer A, a monomer B and an active monomer C, a mass ratio of the monomer A to the monomer B is 7.5:2.5, and the monomer C accounts for 5.5% of a total mass of the monomer; adjusting a pH value to 7.0-7.5 with sodium hydroxide, and adding distilled water to form an aqueous solution with a total mass concentration of 26%-28%; (2) adding an initiator and conducting a reaction under a condition of nitrogen protection at the temperature of 47.0° C.; obtaining an active polymer flooding agent by washing, crushing and drying an reaction product; the monomer A is acrylamide, the monomer B is 2-acrylamide-2-methylpropanesulfonic acid, and the active monomer C is quaternary ammonium salt type active monomer DMCA; DMCA is prepared by the following steps: (1) mixing N, N-dimethyl-1,3-propanediamine and 2-methacryloyl chloride in a dichloromethane solution, and then introducing nitrogen for magnetic stirring and controlling the temperature below 5° C.; after the reaction, extracting the product in a solvent with a volume ratio of water to dichloromethane of 5:1 and taking an subnatant, then conducting a rotary evaporation at 45° C. to remove the excess dichloromethane and obtain an intermediate product; (2) mixing the intermediate product, tetradecane bromide and acetone and keeping them in a sealed state after the nitrogen is introduced at room temperature; heating the system to 55° C. and maintaining the stirring state until the reaction is completed; reducing the temperature of the system to room temperature, repeatedly extracting an crude product with ether for 3 times, and subjecting the subnatant to the rotary evaporation at 60° C.; and removing the ether in the product to obtain the active monomer.

2. The composite displacement system suitable for strong heterogeneous oil reservoir according to claim 1, the total monomer concentration is 27.5%.

3. The composite displacement system suitable for strong heterogeneous oil reservoir according to claim 1, the initiator is azodiisobutylamidine hydrochloride, and the amount of initiator is 0.55% of the total mass of the monomer.

4. An application of the composite displacement system suitable for strong heterogeneous oil reservoir according to claim 1, a degree of an enhanced oil recovery rate in heterogeneous cores with a permeability difference of 5~30 is 18.36%~36.79%, showing excellent adjustment of oil reservoir heterogeneity and oil displacement ability.

* * * * *